US007958499B2

(12) United States Patent
Doi et al.

(10) Patent No.: US 7,958,499 B2
(45) Date of Patent: Jun. 7, 2011

(54) PROGRAM EXECUTION CONTROL DEVICE, PROGRAM EXECUTION CONTROL METHOD, CONTROL PROGRAM, AND RECORDING MEDIUM

(75) Inventors: Shigenori Doi, Hiroshima (JP); Hiroshi Aoki, Higashihiroshima (JP); Yuko Imanishi, Higashihiroshima (JP)

(73) Assignee: Panasonic Corporation, Osaka (JP)

( * ) Notice: Subject to any disclaimer, the term of this patent is extended or adjusted under 35 U.S.C. 154(b) by 1244 days.

(21) Appl. No.: 10/556,396

(22) PCT Filed: May 28, 2004

(86) PCT No.: PCT/JP2004/007731
§ 371 (c)(1),
(2), (4) Date: Oct. 18, 2006

(87) PCT Pub. No.: WO2004/107170
PCT Pub. Date: Dec. 9, 2004

(65) Prior Publication Data
US 2007/0226714 A1    Sep. 27, 2007

(30) Foreign Application Priority Data
May 28, 2003    (JP) .................................. 2003-151472

(51) Int. Cl.
*G06F 9/45* (2006.01)
(52) U.S. Cl. ....................................................... 717/148
(58) Field of Classification Search .................. 717/128, 717/136, 145, 148, 118, 158, 138, 140, 114, 717/153, 157, 144; 719/310, 315; 718/102, 718/108
See application file for complete search history.

(56) References Cited

U.S. PATENT DOCUMENTS

| | | | | |
|---|---|---|---|---|
| 5,835,765 A | * | 11/1998 | Matsumoto | 718/102 |
| 5,970,249 A | | 10/1999 | Hölzle et al. | |
| 5,995,754 A | * | 11/1999 | Holzle et al. | 717/158 |
| 6,240,548 B1 | * | 5/2001 | Holzle et al. | 717/140 |
| 6,463,582 B1 | | 10/2002 | Lethin et al. | |
| 6,530,075 B1 | * | 3/2003 | Beadle et al. | 717/114 |

(Continued)

FOREIGN PATENT DOCUMENTS

EP    0 908 818    4/1999
(Continued)

OTHER PUBLICATIONS

Supplementary European Search Report issued Nov. 10, 2009 in Application No. EP 04 73 5344.
(Continued)

*Primary Examiner* — Tuan Anh Vu
(74) *Attorney, Agent, or Firm* — Wenderoth, Lind & Ponack, L.L.P.

(57) ABSTRACT

When a home appliance equipped with a processor implementing a conventional JVM with a JIT compiler executes uncompiled methods, the execution speed is slower because the methods are compiled at runtime. To suppress the execution speed reduction, a program execution control device judges, on invocation of a method during program execution, whether a method invoked has previously been compiled. If the method is uncompiled, the device executes the method by interpreting associated bytecodes, and also issues a compilation request for the method. If the method is compiled, the device executes native code having been generated by compiling the method. Compilation of a method requested is executed as a separate task from tasks of instruction execution such as interpreter execution or native code execution.

16 Claims, 22 Drawing Sheets

U.S. PATENT DOCUMENTS

| | | | |
|---|---|---|---|
| 7,725,885 B1 * | 5/2010 | Pradhan et al. | 717/148 |
| 2002/0104076 A1 * | 8/2002 | Shaylor | 717/148 |
| 2002/0147969 A1 | 10/2002 | Lethin et al. | |

FOREIGN PATENT DOCUMENTS

| | | |
|---|---|---|
| JP | 64-62705 | 3/1989 |
| JP | 0 331 754 | 9/1989 |
| JP | 4-178734 | 6/1992 |
| JP | 8-328880 | 12/1996 |
| JP | 11-237989 | 8/1999 |
| JP | 2000-132408 | 5/2000 |
| JP | 2002-163115 | 6/2002 |
| JP | 2004-118367 | 4/2004 |

OTHER PUBLICATIONS

Michael P. Plezbert et al., "Does "Just in Time"="Better Late than Never"?", Conference Record of POPL '97, 24$^{th}$ ACM Sigplan-Sigact Symposium on Principles of Programming Language, Paris, Jan. 15-17, 1997; [Conference Record of POPL: ACM Sigplan-Sigact Symposium on Principles of Programming Language], New York, ACM, US, vol. Conf. 28, Jan. 15, 1997, pp. 120-131.

Chandra J. Krintz et al., "Reducing the overhead of dynamic compilation", Software Practice & Experience, Wiley & Sons, Bognor Regis, GB, vol. 31, No. 8, Jul. 10, 2001, pp. 717-738.

Matthew Arnold et al., "Adaptive Optimization in the Jalapeño JVM", ACM Sigplan Notices, ACM, Association for Computing Machinery, New York, NY, US, vol. 35, No. 10, Oct. 1, 2000, pp. 47-65.

Timothy Harris et al., "Controlling run-time compilation", IEEE Workshop on Programming Languages for Real-Time Industrial Applications, [online] Dec. 1998, pp. 75-84, retrieved from the internet: URL:http://research.microsoft.com/en-us/um/people/tharris/papers/1998-plrtia.pdf> [retrieved on Oct. 27, 2009].

"Borland C++5.0 Verification of C++ Development environment", C Magazine, pp. 62, Jun. 1996 along with English translation.

"The Java Virtual Machine Specification (Java Series)", 2$^{nd}$ Edition Chapter 2 and 3, Apr. 14, 1999.

* cited by examiner

FIG.3

```
public class  A
       public void init () {
              int i ;
              for (i=0; i<10  ; i ++) {
                     m1() ;
              } for (i=0; i<5  ; i ++) {
                     m2() ;
              }
       }
       public void m1 () {
              . . . . .
       } public void m2 () {
              . . . . .
       }
}
```

FIG.18

| METHOD NAME | RELATED METHOD 1 | RELATED METHOD 2 | ... |
|---|---|---|---|
| init | m1 | m2 | ... |
| m3 | m4 | m5 | ... |
| ... | ... | ... | |

22

PROGRAM EXECUTION CONTROL DEVICE, PROGRAM EXECUTION CONTROL METHOD, CONTROL PROGRAM, AND RECORDING MEDIUM

TECHNICAL FIELD

The present invention relates to a program execution control device for causing a processor to execute a program composed of sets of bytecodes. More particularly, the present invention relates to a technique for suppressing reduction of execution speed at an initial stage of program execution.

BACKGROUND ART

A virtual machine is platform-independent software for executing a program. Recent years, virtual machines are implemented on various home appliances equipped with processors such as built-in devices.

One exemplary virtual machine is a Java Virtual Machine (JVM) which interprets and executes Java (Registered Trademark) bytecodes (hereinafter simply "bytecodes"). Detailed specifications of JVM are found in "The Java Virtual Machine Specification, Second Edition" (published by Pearson Education, ISBN 4-89471-356-X).

Generally, bytecodes are generated by a Java compiler, such as Javac, by converting a source program written in the Java language. Bytecodes are stored in so-called class files with extension ".class".

The JVM interprets class files and performs control required to causes a processor to execute methods included in the class files. A method is a set of bytecodes for execution of a specific procedure and similar to a member function in other programming languages.

Basically, the JVM works as an interpreter sequentially interpreting bytecodes at runtime. As is generally noted, the execution speed of a bytecode program is lower than the execution speed of a native code program directly executable by a processor. Especially, execution of a program in which the same method is repeatedly invoked involves excess overhead because the same method is repeatedly interpreted each time it is invoked.

To reduce the above overhead, there has been suggested a JVM having a Just-In-Time (JIT) compiler. A JIT compiler converts an invoked method into native code if it is judged that the method has not yet been compiled.

A JIT improves the execution speed because a processor is allowed to execute previously compiled native code when the same method is invoked for a second time.

Also, there is an extension technology of JIT compiler, which is a technique called Java HotSpot (Registered Trademark) capable of determining a method to be compiled into native code. More specifically, Java Hotspot keeps count of the number of times each method is invoked during program execution and compiles the method into native code when the count exceeds a threshold.

JP patent application publication Nos. H4-178734 and S64-62705 disclose program execution control devices having functions of both interpreter and compiler, similarly to the JVM having a JIT compiler.

One problem of JVM having JITs is as follows. The JVM starts compiling a method immediately upon invocation of the method, if the method has not yet been compiled. The resulting native code is executed by a processor when the compilation is done. Thus, the execution speed of an uncompiled method is slower, comparing the interpreter execution of the same method. Reduction in execution speed is especially notable at the initial stage of program execution because more bytecodes need to be compiled.

Similarly, the Java HotSpot technology suffers from the slower execution speed when compilation of an uncompiled method is carried out upon invocation. The method cannot be executed until the compilation is done.

SUMMARY OF THE INVENTION

In order to address the above problems, the present invention aims to provide a program execution control device for suppressing reduction of execution speed that is conventionally caused when executing an uncompiled method because compilation processing is carried out at the time of executing the method. The present invention also aims to provide techniques related to the program execution control device.

According to one aspect of the present invention, the above aim is achieved by a program execution control device for causing a processor to execute a program composed of one or more sets of bytecodes including a bytecode for invoking a bytecode set. The program execution control device includes: a judging unit operable, for each execution of an invocation bytecode during execution of the program, to judge whether a bytecode set targeted for invocation is already compiled to native code specific to the processor; a first unit operable, when the target bytecode set is judged to be uncompiled, to instruct the processor so that the target bytecode set is sequentially interpreted and executed, and to issue a request to compile the target bytecode set to native code; a second unit operable, when the target bytecode set is judged to be compiled, to instruct the processor to execute native code resulting from the compilation; and a third unit operable to instruct the processor to compile a bytecode set indicated by a compilation request issued by the first unit, in parallel with the bytecode interpretation and execution by the first unit as well as with the native code execution by the second unit.

In another aspect of the present invention, a program execution control method for causing a processor to execute a program composed of one or more sets of bytecodes including a bytecode for invoking a bytecode set. The program execution control method includes: a judging step, for each execution of an invocation bytecode during execution of the program, of judging whether a bytecode set targeted for invocation is already compiled to native code specific to the processor; a first step, when the target bytecode set is judged to be uncompiled, of instructing the processor so that the target bytecode set is sequentially interpreted and executed, and of issuing a request to compile the target bytecode set to native code; a second step, when the target bytecode set is judged to be compiled, of instructing the processor to execute native code resulting from the compilation; and a third step of instructing the processor to compile a bytecode set indicated by a compilation request issued in the first step, in parallel with the bytecode interpretation and execution in the first step as well as with the native code execution in the second step.

In yet another aspect of the present invention, a control program for causing a processor to execute another program composed of one or more sets of bytecodes including a bytecode for invoking a bytecode set. The control program includes: a judging step, for each execution of an invocation bytecode during execution of the program, of judging whether a bytecode set targeted for invocation is already compiled to native code specific to the processor; a first step, when the target bytecode set is judged to be uncompiled, of instructing the processor so that the target bytecode set is sequentially interpreted and executed, and of issuing a request to compile the target bytecode set to native code; a second step, when the target bytecode set is judged to be compiled, of instructing the processor to execute native code resulting from the compilation; and a third step of instructing the processor to compile a bytecode set indicated by a compilation request issued in the first step, in parallel with the bytecode interpretation and execution in the first step as well as with the native code execution in the second step.

In yet another aspect of the present invention, a recording medium storing a control program for causing a processor to execute another program composed of one or more sets of bytecodes including a bytecode for invoking a bytecode set. The control program includes: a judging step, for each execution of an invocation bytecode during execution of the program, of judging whether a bytecode set targeted for invocation is already compiled to native code specific to the processor; a first step, when the target bytecode set is judged to be uncompiled, of instructing the processor so that the target bytecode set is sequentially interpreted and executed, and of issuing a request to compile the target bytecode set to native code; a second step, when the target bytecode set is judged to be compiled, of instructing the processor to execute native code resulting from the compilation; and a third step of instructing the processor to compile a bytecode set indicated by a compilation request issued in the first step, in parallel with the bytecode interpretation and execution in the first step as well as with the native code execution in the second step.

Here, a bytecode set may be a method or a member function.

With the structure stated above, when a bytecode set (method) invoked has not yet been compiled, the bytecode set is executed by sequential interpretation. Thus, it is ensured to suppress such execution speed reduction that a conventional JIT-enabled JVM suffers from and that is especially notable at an initial stage of the program execution. The execution speed reduction is caused by compiling the method at the time of executing the method. With the above structure, in addition, compilation of uncompiled methods is carried out in parallel with execution of methods. Thus, it is avoided that the execution speed of the overall program becomes slower.

Here, the program execution control device may operate under control of a multitask operating system. The compilation by the third unit may be executed as a separate task from the bytecode execution by the first unit and the native code execution by the second unit. The tasks of the first and second units may be assigned a higher priority level than a priority level assigned to the task of the third unit.

With the structure stated above, the instruction execution tasks are executed on a priority basis over the compilation task. Thus, it is ensured to suppress execution speed reduction that is conventionally notable at the initial stage of program execution.

Here, the program execution control device may further include a switching unit operable to switch to task execution by the third unit when task execution by the first or second unit is placed in a standby state.

With the structure stated above, the compilation task is executed when the instruction execution tasks are put into a standby state. This ensures that the compilation is promptly executed. By promptly executing the compilation, interpreter execution of instructions is required a smaller number of times, which leads to improve execution speed of the overall program.

Here, the program execution control device may further include a request management unit operable to register compilation request information in a storage unit in response to a compilation request issued by the first unit and manage the registered compilation request information. Each piece of compilation request information is used for compiling a bytecode set indicated by a corresponding compilation request. The third unit may instruct the processor to compile each bytecode set indicated by compilation request information registered in the storage unit, in parallel with the bytecode interpretation and execution by the first unit as well as with the native code execution by the second unit.

With the structure stated above, the compilation of bytecode sets are carried out according to compilation request information registered and managed in the storage unit by the request management unit.

Here, the request management unit may place pieces of compilation request information in a queue in an order in which corresponding compilation requests are received. The third unit may instruct the processor to compile bytecode sets in order starting from a bytecode set indicated by a first piece of queued compilation request information.

With the structure sated above, the compilation of bytecode sets is carried out in the order in which respective compilation requests are received.

Here, the request management unit may not register compilation request information in duplicate, if compilation request information for a bytecode set indicated by a compilation request is already registered in the storing unit.

With the structure stated above, it is avoided to register a piece of compilation information if the same piece is already registered. Thus, no compilation request information is registered in duplicate.

Here, the program execution control device may further include: a priority information acquiring unit operable to acquire information showing a priority level of each bytecode set. The request management unit may include: a specifying subunit operable, in response to a compilation request issued by the first unit, to specify with reference to the acquired priority information a priority level of a bytecode set indicated by the compilation request; a comparing subunit operable to compare the specified priority level with a priority level of each bytecode set indicated by queued compilation request information in the storage unit; and a determining subunit operable to determine a position for placing a new piece of compilation request information for the bytecode set indicated by the compilation request, so that the registered pieces of compilation request information are queued in descending order of priority.

With the structure stated above, bytecode sets having a higher priority level are executed earlier.

Here, the program execution control device may further include: a relational information acquiring unit operable to acquire relational information showing each bytecode set together with all bytecode sets related to the bytecode set; and a detecting unit operable to detect, with reference to the relational information, any bytecode set related to the bytecode set indicated by the compilation request. The request management unit may register compilation request information for the related bytecode set detected by the detecting unit.

With the structure stated above, compilation request information is registered additionally for bytecode sets related to a bytecode set that is requested to be compiled.

Here, the program execution control device may further include a priority information acquiring unit operable to acquire information showing a priority level of each bytecode set. With reference to the acquired priority information, the third unit may instruct the processor to compile bytecode sets indicated by pieces of compilation request information registered in the storage unit, in descending order of priority.

With the structure stated above, bytecode sets having a higher priority level are executed earlier.

Here, the program execution control device may further include: a count recording unit operable to keep a count of compilation requests made to a respective bytecode set when compilation of the bytecode set is repeatedly requested, and records the request count to the storage unit as part of compilation request information for the bytecode set; and an acquiring unit operable to acquire a threshold of request count. The third unit may instruct the processor to compile bytecode sets in order in which respective requests counts exceed the threshold.

With the structure stated above, bytecode sets are compiled in the order in which respective counts of compilation requests exceed the threshold.

Here, the program execution control device may further include: a count recording unit operable to keep a count of compilation requests made to a respective bytecode set when compilation of the bytecode set is repeatedly requested, and records the request count to the storage unit as part of compilation request information for the bytecode set; and an order altering unit operable to compare the respective request counts and alter positions of pieces of queued compilation request information in descending order of request count.

With the structure stated above, bytecode sets are compiled in descending order of number of compilation requests. Thus, interpreter execution of bytecode sets is required for a less number of times and thus execution speed of the overall program improves.

Here, the request management unit may manage a plurality of queues with different priority levels. The third unit may instruct the processor to compile bytecode sets in order starting from bytecode sets indicated by compilation request information placed in a highest priority queue.

With the structure stated above, depending on queues in which corresponding compilation request information is registered, it is determined which bytecode sets need to be processed on a priority basis and which are not.

Here, the program execution control device may further include: a special request information acquiring unit operable to acquire, prior to execution of the program, information showing a plurality of bytecode sets requested to be compiled. The request management unit may register, in a batch, compilation request information for all bytecode sets shown by the special request information, in a highest priority queue.

With the structure stated above, the special request information is generated to indicate bytecode sets that need to be compiled on a priority basis. This ensures that the bytecode sets are compiled on a priority basis.

Here, the program execution control device may further include: a second judging unit operable, when the judging unit judges that the target bytecode set is uncompiled, to judge whether the target bytecode set is currently under compilation; and a fourth unit operable, when the target bytecode set is judged to be currently under compilation, to wait until the compilation is done and to subsequently instruct the processor to execute native code resulting from the compilation.

With the structure stated above, when executing an uncompiled bytecode set and the bytecode set is already under compilation, the program execution control device waits until the compilation is done, so that the bytecode set is executed using native code resulting from the compilation.

Here, the program execution control device may further include: a priority information acquiring unit operable to acquire information showing a priority level of each bytecode set; a comparing unit operable to compare priority levels of the bytecode set targeted for the compilation and of the instruction execution task; and a priority altering unit operable to temporarily raises a priority level of the compilation task, when the comparison shows that the priority level of the bytecode set is higher than the priority level of the instruction execution task.

With the structure stated above, when compiling a bytecode set of which priority level is higher than the instruction execution tasks, the priority level of the compilation task is temporarily raised. Consequently, the compilation of that particular bytecode set is carried out promptly.

BRIEF DESCRIPTION OF THE DRAWINGS

FIG. 3 is a view of an exemplary source program written in the Java language;

FIG. 18 is a view of a specific example of a related method table 28;

DETAILED DESCRIPTION OF THE INVENTION

Overview

A program execution control device according to the present invention may be embodied as a computer device provided with a processor and a storage medium, such as a memory or a hard disk. Specifically, the present invention may be embodied as a mobile phone or a digital broadcast receiver.

The storage medium of the program execution control device stores a multitask operating system (OS), a JVM, class files, and class libraries. A class library is a collection of general-purpose components that are used quite often, such as classes and methods. The program execution control device carries out various functions by a processor operating in accordance with the multitask OS stored in the storage medium and also with the JVM running under control of the multitask OS.

When invoking a method during program execution, the program execution control device judges whether the invoked method has been compiled. On judging that the method is uncompiled, the program execution control device executes bytecode associated with the method by interpretation. At the same time, the program execution control device registers a request for compiling the method. On the other hand, on judging that the method has been compiled, native code associated with the method is executed. Compilation of the method relating to the registered request is carried out as a separate task from instruction execution tasks, such as execution of bytecodes by interpretation and execution of native code.

Hereinafter, a task of executing bytecodes or native code is referred to as an instruction execution task, whereas a task of compilation is referred to as a compilation task. A feature of the present invention lies in asynchronous and parallel execution of the instruction execution task and the compilation task.

Figure 1:
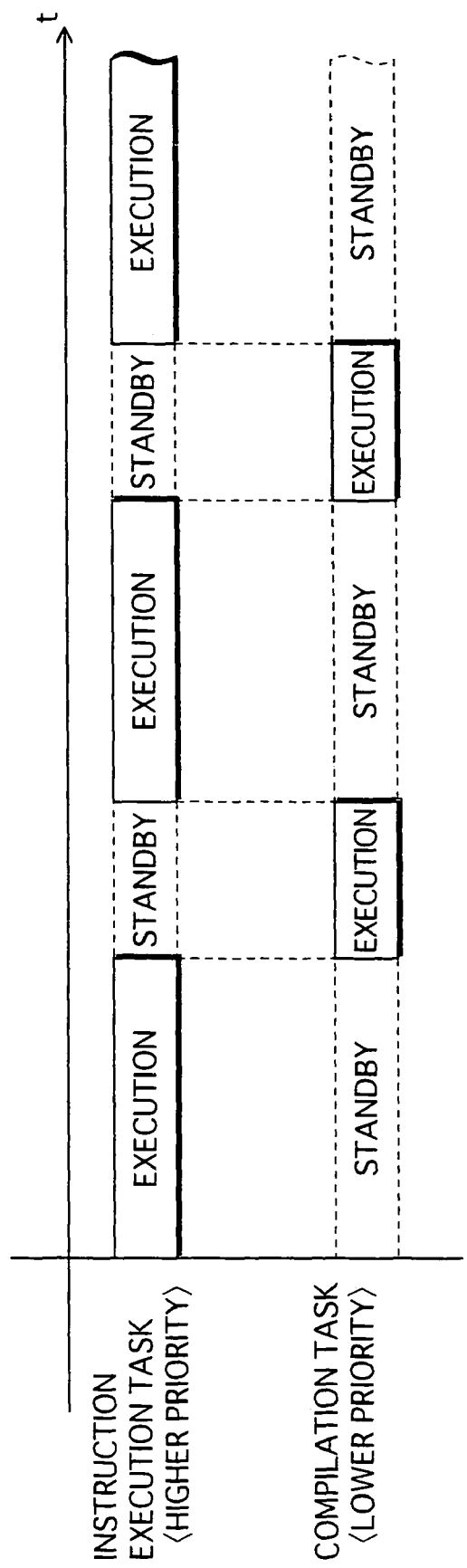
FIG. 1 is a view of execution transition between an instruction execution task and a compilation task.

FIG. 1 is a view of execution transition between the instruction execution task and the compilation task.

The program execution control device according to the present invention allocates resources of a single processor according to preemptive priority-based task scheduling.

The instruction execution task is assigned a higher priority, whereas the compilation task is assigned a lower priority. The processing time is allocated to the higher and lower priority tasks at the ratio of 9:1. It is further controlled that execution is switched to the compilation task immediately upon placement of the instruction execution task into a standby state.

With the above arrangement, the program execution control device of the present invention compiles an uncompiled method not when the method is invoked but when executing the compilation task. Consequently, it is ensured to reduce delay in startup owing to the compilation that is frequently required at the initial stage of program execution, and thus suppressing reduction in execution speed.

Hereinafter, a description is given to embodiments of a program execution control device according to the present invention.

Embodiment 1

Structure 1

Figure 2:
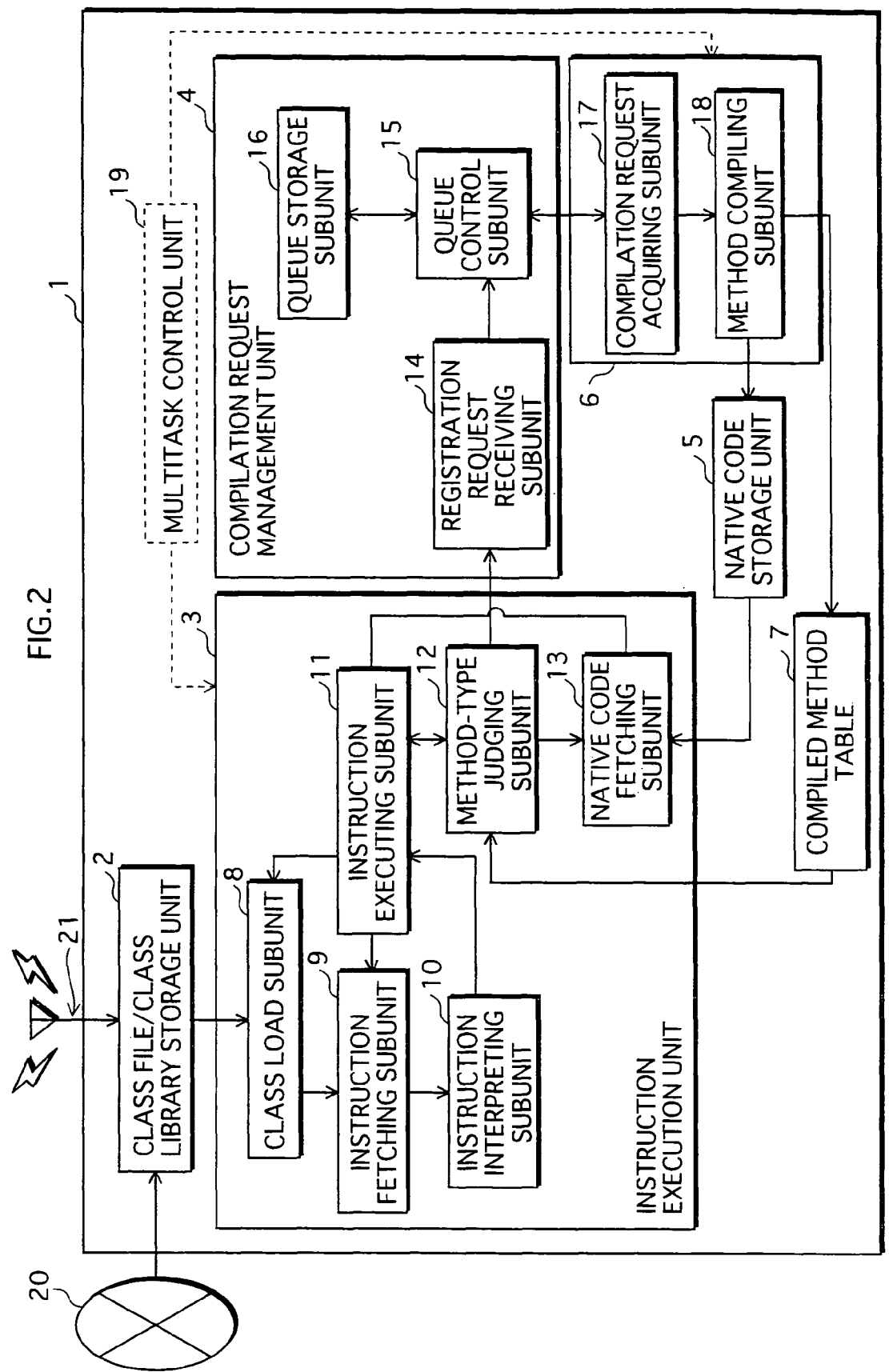
FIG. 2 is a functional diagram of a program execution control device 1 according to an embodiment 1.

FIG. 2 is a functional diagram of a program execution control device 1 according to an embodiment 1.

As shown in the figure, the program execution control device 1 is composed of a class file/class library storage unit 2, an instruction execution unit 3, a compilation request management unit 4, a native code storage unit 5, a compilation unit 6, a compiled method table 7, and a multitask control unit 19. Note that the figure exclusively shows functional blocks relating to the gist of the present invention. No description is given to non-illustrated functional blocks although those functional blocks are normally provided in a computer implementing a multitask OS and a JVM.

The class file/class library storage unit 2 is a storage medium, and class files and class libraries are stored.

The class files are obtained via an antenna 21 or a network 20.

The instruction execution unit 3 sequentially interprets bytecodes as they are read from the class file/class library storage unit 2, and instructs a processor to execute the interpreted bytecodes. At the time when a previously compiled method is invoked, the instruction execution unit 3 instructs the processor to execute native code associated with the method.

Now, a description is given to functional blocks included in the instruction execution unit 3. The instruction execution unit 3 includes a class load subunit 8, an instruction fetching subunit 9, an instruction interpreting subunit 10, an instruction executing subunit 11, a method-type judging subunit 12, and a native code fetching subunit 13.

The class load subunit 8 loads to a memory a class file or a class library from the class file/class library storage unit 2.

The instruction fetching unit 9 fetches, on an instruction-by-instruction basis, bytecodes associated with the class file or class library loaded to the memory.

The instruction interpreting subunit 10 interprets fetched bytecode instructions into native code.

The instruction executing subunit 11 instructs the processor to execute native code.

If an instruction targeted for execution by the instruction executing subunit 11 is an invocation instruction for invoking a method, the method-type judging subunit 12 judges with reference to the compiled method table 7 whether the method targeted for invocation has previously been compiled. Examples of invocation instructions in Jasmin-syntax assembler code include the following: "invokevirtual", "invokespecial", "invokestatic", and "invokeinterface".

When it is judged that the target method is compiled, the native code fetching subunit 13 fetches native code associated with the method from the native code storage unit 5, and sends the fetched native code to the instruction executing subunit 11. The instruction executing subunit 11 instructs the processor to execute the fetched native code.

On the other hand, when it is judged that the target method is uncompiled, the method-type judging subunit 12 issues a compilation request for the method to the compilation request management unit 4. In addition, the instruction fetching subunit 9 fetches a bytecode set associated with the target method on an instruction-by-instruction basis. The instruction interpreting subunit 10 sequentially interprets the fetched bytecode instructions. Finally, the instruction executing subunit 11 instructs the processor to execute the native code generated by interpreting the bytecode instructions associated with the target method.

The compilation management unit 4 receives a compilation request from the method type judging unit 12, and manages the compilation order of methods indicated by received compilation requests. The compilation request management unit 4 includes a registration request receiving subunit 14, a queue control subunit 15, and a queue storage subunit 16.

The registration request receiving subunit 14 receives a compilation request from the method type judgment unit 12. By receiving a compilation request, the registration receiving unit 14 acquires information about a method requested to be compiled, such as an identifier identifying the method and a storage address of the bytecode set associated with the method.

The queue storage subunit 16 is a storage medium, such as a RAM.

The queue control subunit 15 stores a plurality of pieces of compilation request information into the queue storage unit 16, and manages the stored pieces of compilation request information in a queue. More specifically, upon receipt of a compilation request by the registration request receiving subunit 14, the queue control unit 15 registers, into the queue, compilation request information for the compilation request. Upon receipt, from the compilation unit 6, of an acquisition request for compilation request information, the queue control subunit 15 informs the compilation unit 6 about the method indicated by the first piece of queued compilation request information. When the compilation of the method is done, the compilation processing unit 6 informs the queue control subunit 15 about the completion. In response, the queue control subunit 15 deletes the corresponding piece of compilation request information from the queue storage unit 16.

At the time of informing the compilation unit 6 about a method indicated by the first piece of queued compilation request information in response to an acquisition request for compilation request information, the queue control unit 15 sets a bit flag included in the compilation request information to show the compilation state of the method. When the flag is set, the method is currently under compilation.

The queue control subunit 15 performs exclusive control of registration and deletion of compilation request information. That is, the queue control subunit 15 never performs registration and deletion of compilation request information at the same time. In addition, the queue control subunit 15 avoids registering compilation request information if the same piece of compilation request information is already registered in the queue storage subunit 16.

The compilation unit 6 is composed of a compilation request acquiring subunit 17 and a method compiling subunit 18. The compilation request acquiring subunit 17 acquires, by issuing an acquisition request, information about a method requested to be compiled from the queue control unit 15. The method compiling subunit 18 compiles a bytecode set associated with the method into native code.

Native code generated by the method compiling subunit 18 is stored in the native code storage unit 5. Correspondingly, the compiled method table 7 comes to additionally store a piece of compiled method information that is composed of a method name and a storage address of native code associated with the method. Upon completion of the compilation, the compilation request acquiring subunit 17 informs the queue control subunit 15 that the method has now been compiled.

The multitask control unit 19 is a function of the multitask OS, and allocates, by priority-based task scheduling, the processor resources to the instruction execution task assigned to the instruction execution unit 3 and the compilation task assigned to the compilation unit 6, respectively.

Data 1

Now, a description is given to various data.

First, a description is given to a program executed by the program execution control device 1.

FIG. 3 is a view of an exemplary source program written in the Java language. Note that no description is given to the methods "m1" and "m2" because these methods are not particularly relevant to the present invention. Bytecodes generated by converting the source program shown in the figure is contained in a class file A. The class file A is stored in the class file/class library storage unit 2 of the program execution control device 1.

During execution of a class file by the program execution control device 1, a method is invoked with an invocation instruction contained in the class file. In the case of the program shown in FIG. 3, first, the method "init" is invoked once. Next, the method "m1" is invoked ten times, and then the "m2" method is invoked five times.

Now, a description is given to compilation request information.

Figure 4:
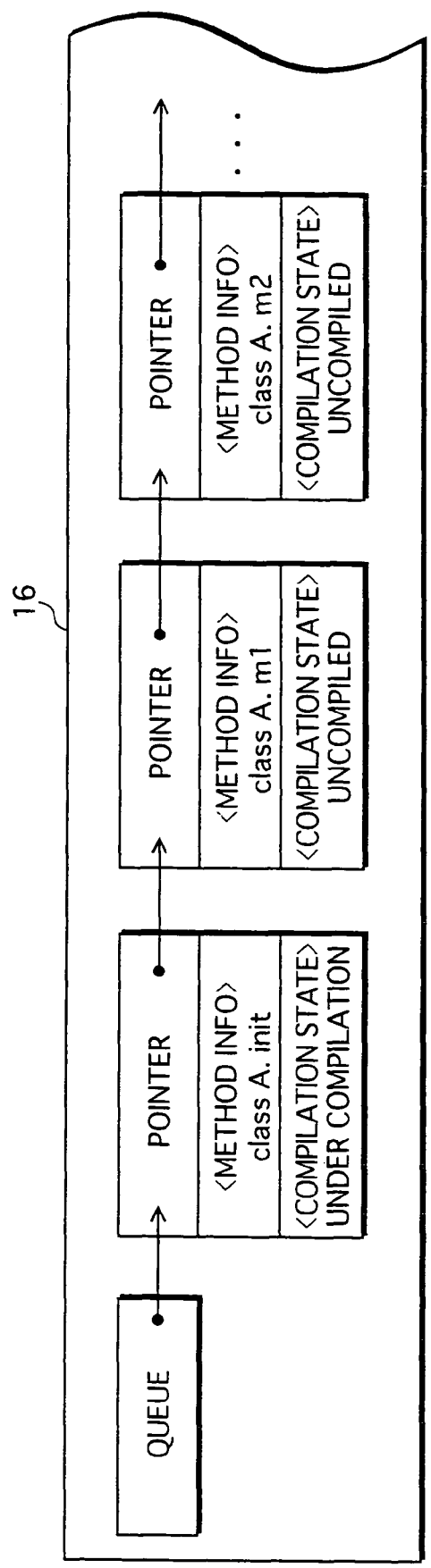
FIG. 4 is a view of a specific example of compilation request information registered in a queue storage subunit 16 according to the embodiment 1.

FIG. 4 is a view of a specific example of compilation request information registered in the queue storage subunit 16.

Each piece of compilation request information is composed of a pointer to the storage location of a subsequent piece of compilation request information, method information, and a bit flag showing the compilation state. That is, each piece of compilation request information is linked to another with the pointer, thereby forming a queue.

The method information is composed generally of an identifier identifying the method requested to be compiled, and the storage address of a bytecode set associated with the method.

The bit flag indicates the compilation state of the method. When the bit flag is set, the method is now in the process of compilation. When the bit flag is not set, compilation of the method has not started yet. In the figure, the method is indicated either as "Under Compilation" or "Uncompiled" for the simplicity sake.

In the figure, the compilation request information for the method "init" is placed at the top of the queue, followed by the compilation request information for the method "m1" and then by the compilation request information for the method "m2". In this example, when receiving from the compilation unit 6 an acquisition request for information about a method to be compiled, the queue control subunit 15 provides information about the method "init" to the compilation unit 6. In response, the compilation unit 6 compiles the method "init". Upon completion of the compilation, the compilation unit 6 informs the queue control subunit 15 that the method "init" has now been compiled.

On receiving the notification that the method "init" is compiled, the queue control subunit 15 deletes the piece of compilation request information for the method "init" from the queue storage subunit 16. In addition, the queue control subunit 15 updates the pointer to the first piece of queued compilation request information, so as to indicate the piece of compilation request information for the method "m1".

Now, a description is given to the compiled method information.

Figure 5:
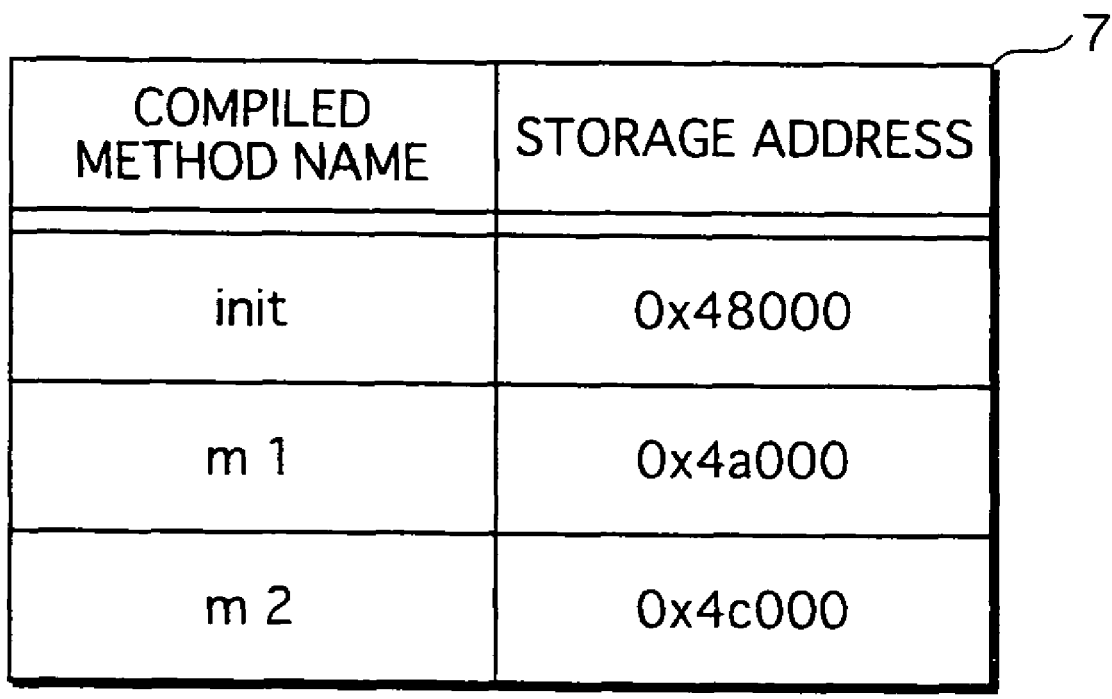
FIG. 5 is a view of an example of a compiled method table.

FIG. 5 is a view of an example of the compiled method table 7. Each piece of compiled method information is composed of an identifier identifying a compiled method (such as a method name) and the storage address of associated native code.

Operation 1

Now, a description is given to operation of the program execution control device 1.

Figure 6:
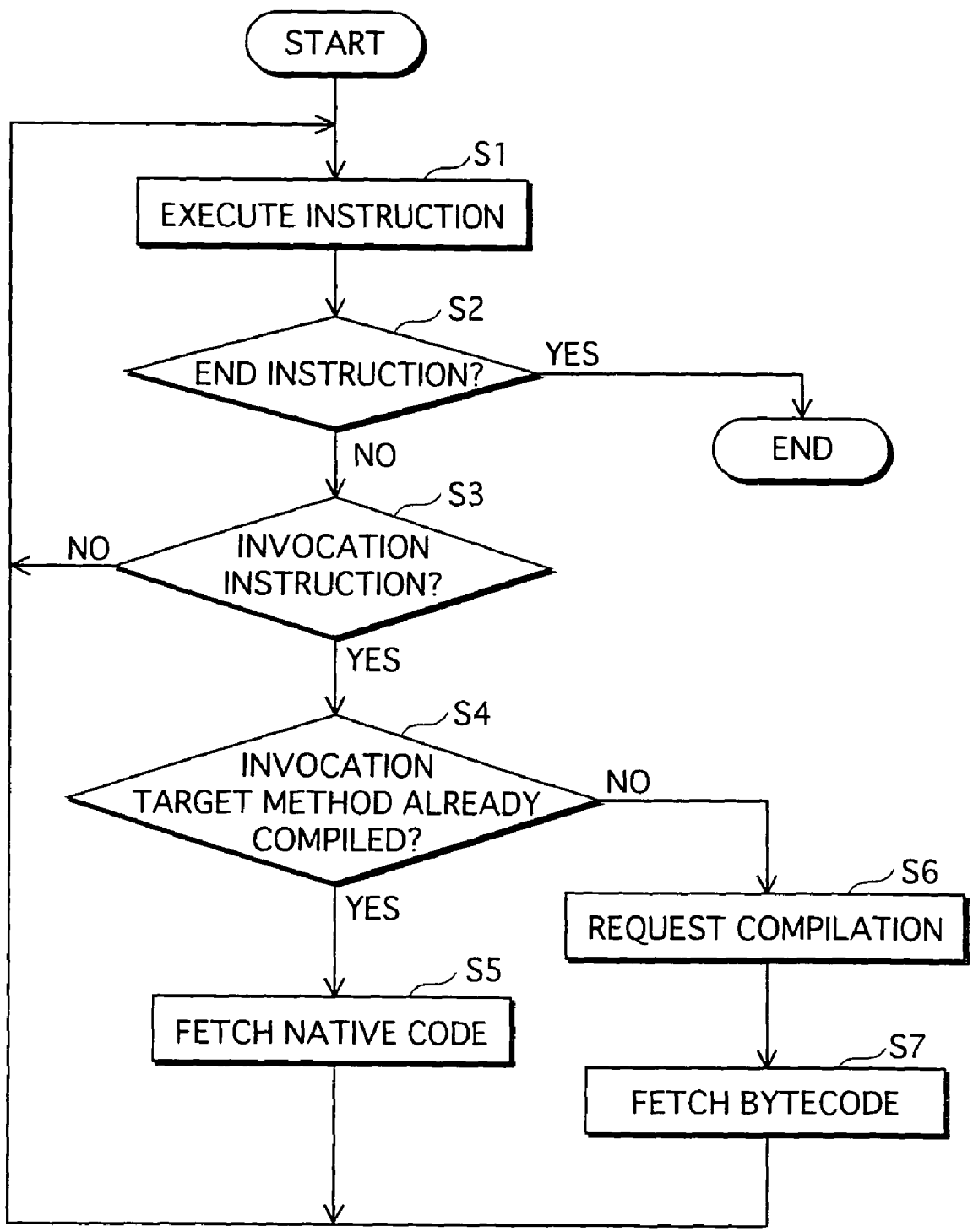
FIG. 6 is a flowchart of an instruction execution task performed.

FIG. 6 is a flowchart of the instruction execution task performed by the instruction execution unit 3.

First, the instruction executing subunit 11 causes the processor to execute a fetched native code instruction (step S1).

If the instruction targeted for execution is a program end instruction (step S2: YES), processing is terminated. If the target instruction is not a program end instruction (step S2: NO), a step S3 is performed.

In the step S3, if the target instruction is an invocation instruction (step S3: YES), a step S4 is performed. In the step S3, on the other hand, if the target instruction is not an invocation instruction (step S3: NO), processing returns to the step S1.

In the step S4, with reference to the compiled method table 7, the method-type judging subunit 12 judges whether a method targeted for invocation has previously been compiled. If the target method is compiled (step S4: YES), a step S5 is performed. If the target method is uncompiled (step S4: NO), a step S6 is performed.

In the step S5, the native code fetching subunit 13 fetches native code associated with the target method from the native code storage unit 5; and sends the fetched native code to the instruction executing subunit 11. Then, processing returns to the step S1.

In the step S6, the method-type judging subunit 12 issues a compilation request to the compilation request management unit 4. In a step S7 that follows, the instruction fetching subunit 9 fetches bytecodes associated with the target method, and the instruction interpreting subunit 10 interprets the fetched bytecodes. Then, processing returns to the step S1.

Separately, the compilation unit 6 executes the compilation task. On allocation of the processor resources by the multitask control unit 19, the compilation unit 6 compiles a bytecode set associated with a method, acquired from the queue control subunit 15 in response to an acquisition request that the compilation unit 6 has issued.

Next, a specific example of operation is described with reference to FIGS. 2, 4, and 5. First, consideration is given to the case where the instruction executing subunit 11 shown in FIG. 2 instructs the processor to execute an invocation instruction for the method "m2". In this case, the method-type judging subunit 12 judges whether the method "m2" has previously been compiled, with reference to compiled method table 7 shown in FIG. 5.

The compiled method table 7 stores information identifying the method "m2" as a compiled method, together with the storage address of associated native code. Accordingly, the method-type judging subunit 12 judges that the method "m2" is compiled, and thus instructs the native code fetching subunit 13 to fetch the associated native code. The fetched native code is then sent to the instruction executing subunit 11 and executed.

Considering now the case where the instruction executing subunit 11 instructs the processor to execute an invocation instruction for a non-illustrated method "m3". In this case, since the method "m3" is not listed in the compiled method table 7 shown in FIG. 5, the method-type judging subunit 12 judges that the method "m3" is uncompiled and thus issues a compilation request for the method "m3" to the compilation request management unit 4. Separately, the method "m3" is executed by sequentially interpreting associated bytecodes on an instruction-by-instruction basis, i.e. by so-called interpreter execution.

The compilation request management unit 4 registers the compilation request information for the method "m3" at the end of the queue shown in FIG. 4. That is, the compilation request information is placed subsequent to the compilation request information for the method "m2".

Embodiment 2

The following describes a program execution control device of an embodiment 2 of the present invention. There is a case where a compilation request is made for the same method of which compilation request information is already registered in the queue. In such a case, the program execution control device of the embodiment 2 keeps count of compilation requests made to respective methods and sorts, based on the request counts, pieces of compilation request information that are initially queued in the registration order. As a result, the pieces of compilation request information are queued in the descending order of request count.

With this arrangement, it is ensured that a method that is more frequently invoked is compiled earlier than a less frequently invoked method. Therefore, the program execution speed improves.

The following describes the program execution control device of the embodiment 2, with respect to its structure, data, and operation. Note that description overlapping that of the program execution control device 1 of the embodiment 1 is not repeated here.

Structure 2

Figure 7:
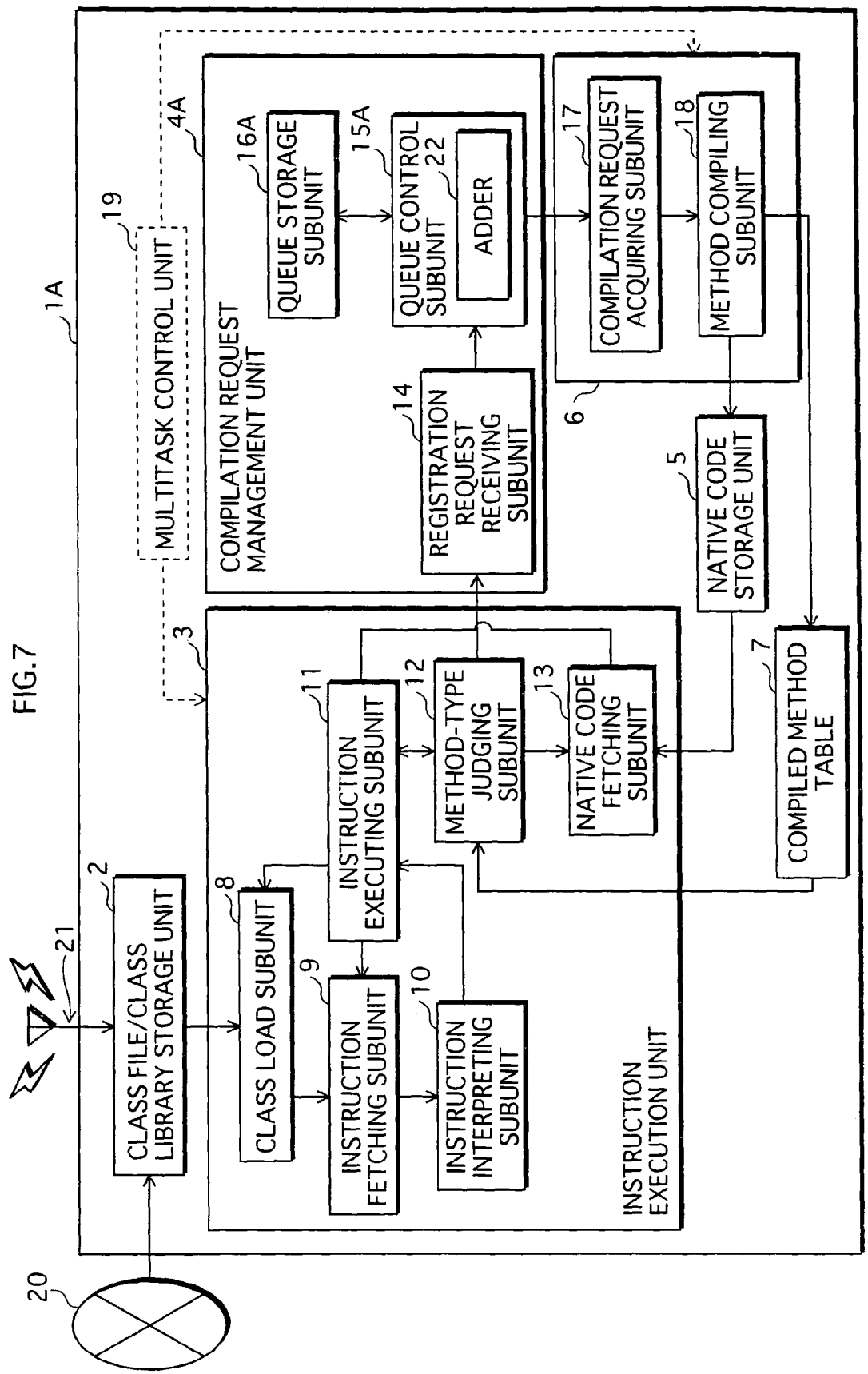
FIG. 7 is a functional diagram of a program execution control device 1A according to an embodiment 2.

FIG. 7 is a functional diagram of a program execution control device 1A according to the embodiment 2.

The program execution control device 1A differs from the program execution control device 1 in that a queue control subunit 15A is additionally provided with an adder 22.

The adder 22 holds a request count of each method as part of a corresponding piece of compilation request information. In response to a compilation request for the method of which compilation request information has already been registered, the adder 22 increments the request count of that method by "1". Note that the increment is performed provided that compilation of the requested method is not yet started at the time of receiving the compilation request. The queue control subunit 15A then updates the corresponding piece of compilation request information with the incremented request count.

Data 2

Next, a description is given to a specific example of compilation request information registered in a queue storage subunit 16A of the embodiment 2.

Figure 8:
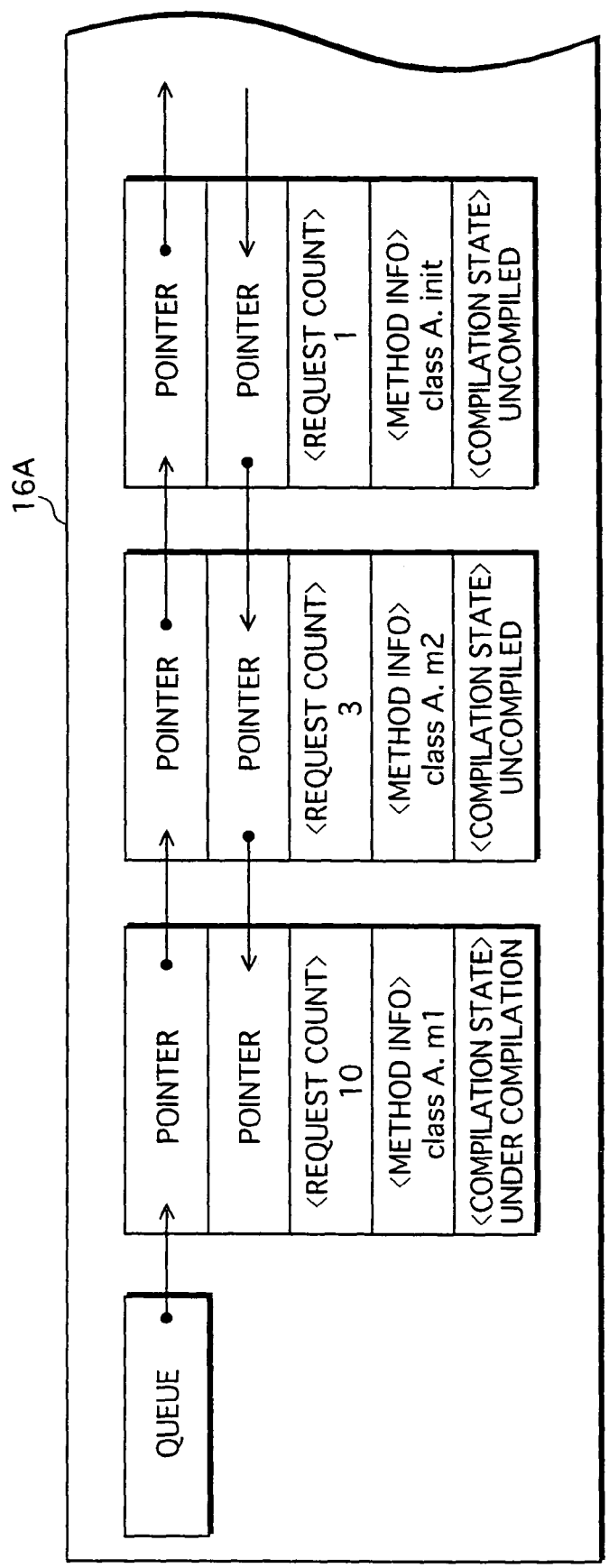
FIG. 8 is a view of a specific example of compilation request information registered in a queue storage subunit 16A according to the embodiment 2.

FIG. 8 is a view of a specific example of compilation request information registered in the queue storage subunit 16A. The compilation request information shown in the figure differs from that of the embodiment 1 in the following points. According to the embodiment 2, each piece of compilation request information includes two pointers, one to the immediately preceding piece of compilation request information and the other to the immediately subsequent piece. In addition, each piece of compilation request information is provided with an area for storing the request count.

FIG. 8 shows pieces of compilation request information that are sorted in descending order of request count.

Operation 2

Next, a description is given to the sort processing of the queued compilation request information.

Figure 9:
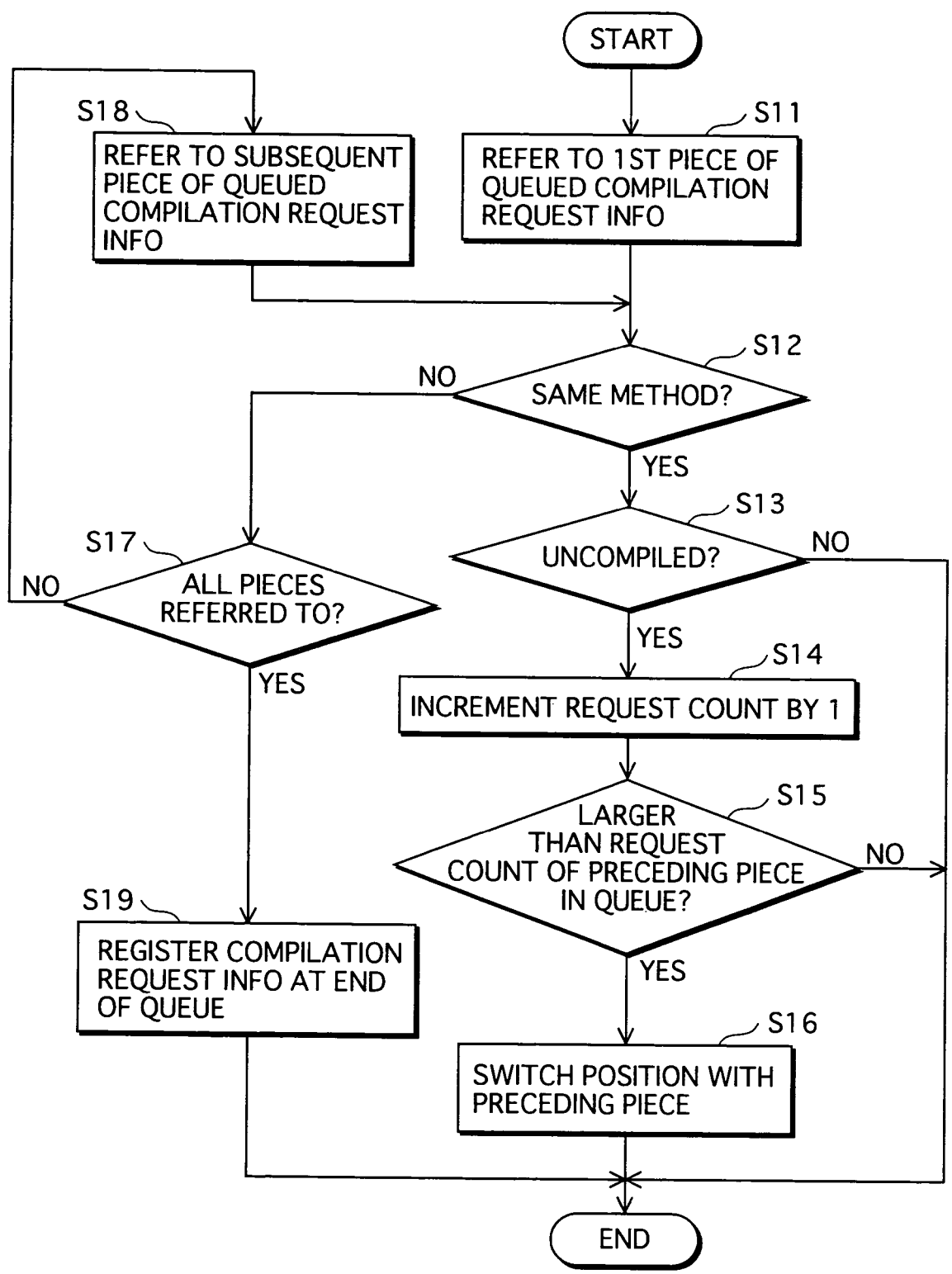
FIG. 9 is a flowchart of sort processing of compilation request information.

FIG. 9 is a flowchart of the sort processing of compilation request information performed by the queue control subunit 15A.

First, upon receipt of a compilation request by the registration request receiving subunit 14, the queue control subunit 15A refers to the first piece of queued compilation request information (step S11).

Next, the method indicated by the received compilation request is compared with the method indicated by the method currently referred to. If the two methods match (step S12: YES), a step S13 is performed. If the two methods do not match (step S12: NO), a step S17 is performed.

In the step S17, it is judged whether all the pieces of compilation request information have already been referred to. If all the pieces are referred to (step S17: YES), a step S19 is performed. If not (step S17: NO), a step S18 is performed.

In the step S18, in accordance with the pointer of the compilation request information currently referred to, the queue control subunit 15 now refers to an immediately subsequent piece of queued compilation request information, and moves onto a step S12.

In the step S19, the queue control subunit 15A registers, at the end of the queue, compilation request information for the method indicated by the received compilation request.

In the step S13, the queue control subunit 15A judges, with the bit flag of the method indicated by the compilation request information currently referred to, whether compilation of the method has not yet been initiated or is already underway. If the compilation is underway (step S13: NO), the sort processing is terminated. If the compilation is not yet initiated (step S13: YES), a step S14 is performed.

In the step S14, the queue control subunit 15A updates the request count of the compilation request information currently referred to, by incrementing by "1". Next, in the step S15, the queue control subunit 15A compares the request count of an immediately preceding piece of queued compilation request information with the updated request count to see which holds a larger value.

If the comparison shows that the updated request count holds a larger value than the request count of the immediately preceding piece of queued compilation request information (step S15: YES), a step S16 is performed. If not (step S15: NO), the sort processing is terminated.

In the step S16, the queue control subunit 15A alters the positions of the immediately preceding piece of compilation request information with the compilation request information of which request count has been updated. That is, the queue control subunit 15A modifies the pointer information of the two pieces of compilation request information. In addition, the queue control subunit 15A modifies the pointer information of pieces of compilation request information preceding and subsequent to the two pieces. This completes the sort processing.

Embodiment 3

A program execution control device according to an embodiment 3 Acquires a priority information table from a class file. The priority information table stores the priority level of each method. With reference to the acquired priority information table, the program execution control device identifies a priority level of each method to be compiled and determines the order of compilation request information in a queue according to the priority levels.

The above arrangement ensures that a higher priority method is compiled earlier than a lower priority method, so that the program execution speed improves.

The following describes the program execution control device according to the embodiment 3, with respect to its structure, data, and operation. Note that the description overlapping the description of the program execution control device 1 is not repeated here.

Structure 3

Figure 10:
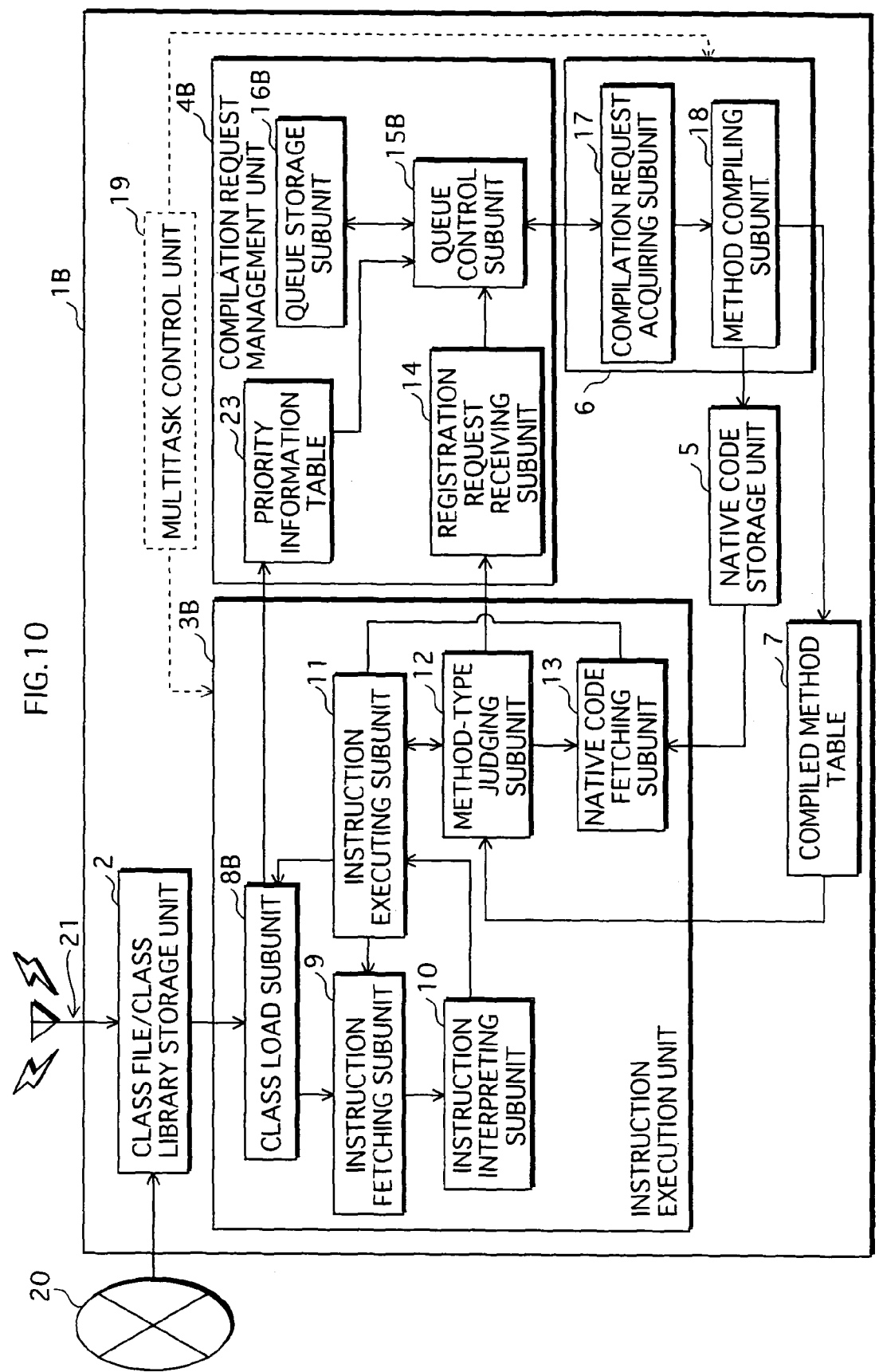
FIG. 10 is a functional diagram of a program execution control device 1B according to an embodiment 3.

FIG. 10 is a functional diagram of a program execution control device 1B according to the embodiment 3.

The program execution control device 1B differs from the program execution control device 1 in that a priority information table 23 is acquired, and that the queue control subunit 15B determines, based on the priority level of associated method, the position in the queue for placing compilation request information.

Data 3

Next, a description is given to various data.

Figure 11:
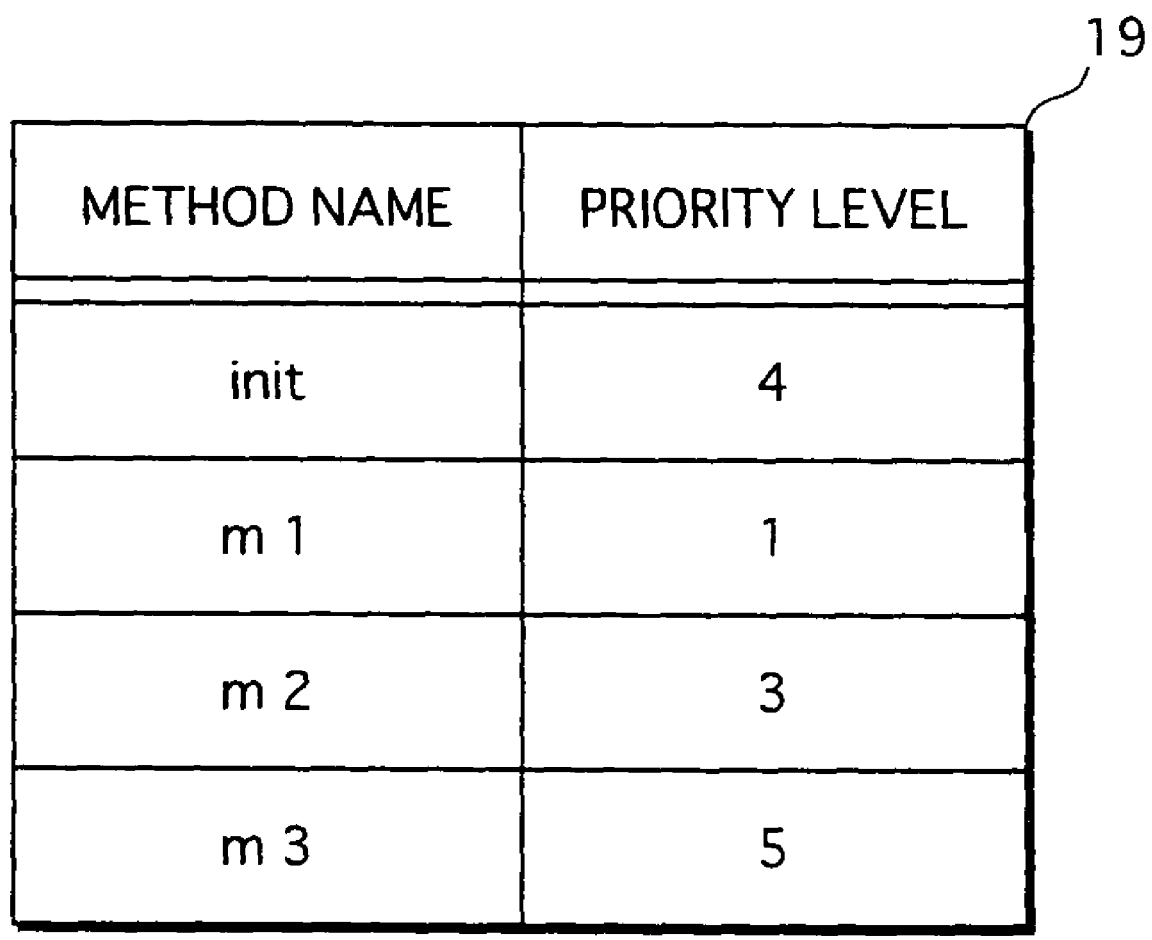
FIG. 11 is a view of a specific example of a priority information table 23 acquired from a class file.

FIG. 11 is a view of a specific example of the priority information table 23 acquired from a class file. The priority information table 23 shows each method with a priority level assigned thereto. The priority level is an index of priority given to the method in the order to be compiled, and a larger value indicates a higher priority. In descending order of priority, the methods "m3", "init", "m2", and "m1" are placed in the stated order. Note in the present embodiment, the methods have different priority levels.

Figure 12:
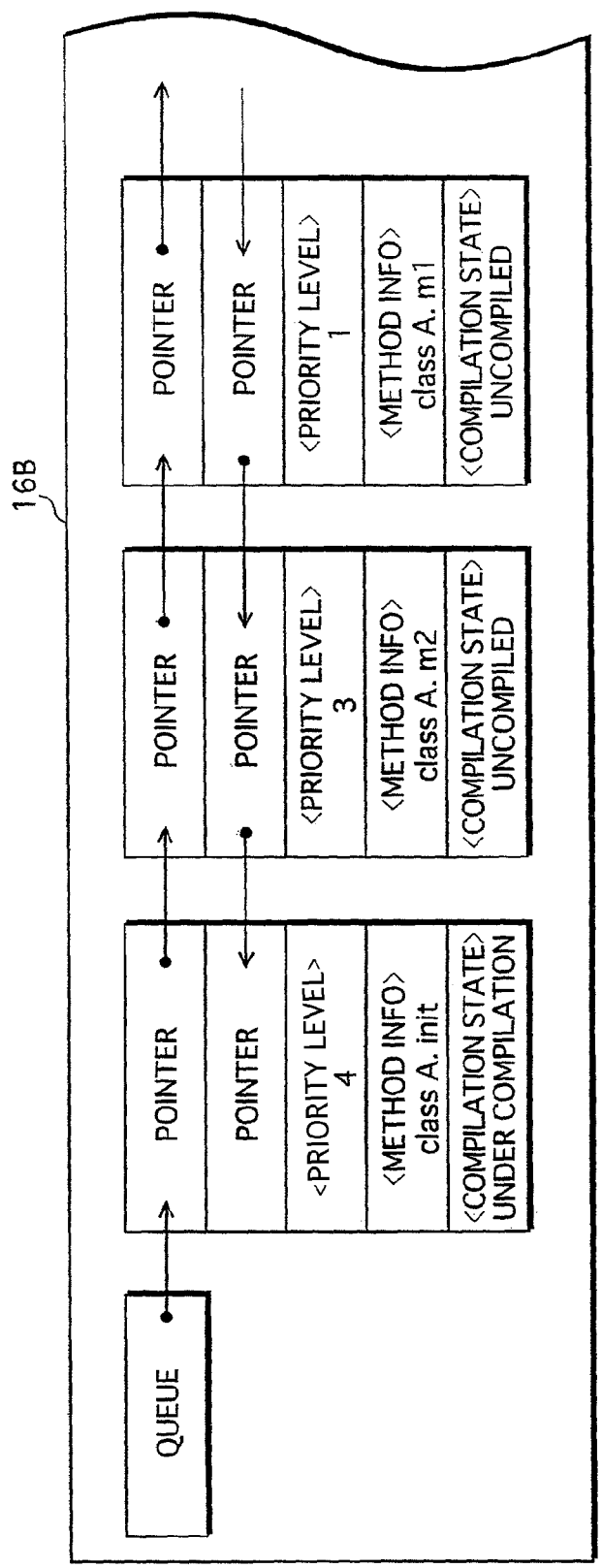
FIG. 12 is a view of a specific example of compilation request information registered in a queue storage subunit 16B according to the embodiment 3.

FIG. 12 is a view of a specific example of compilation request information registered in a queue storage subunit 16B. As shown in the figure, compilation request information having a higher priority is placed at the front of the queue.

Operation 3

Next, a description is given to compilation request information placement processing by the queue control subunit 15B.

Figure 13:
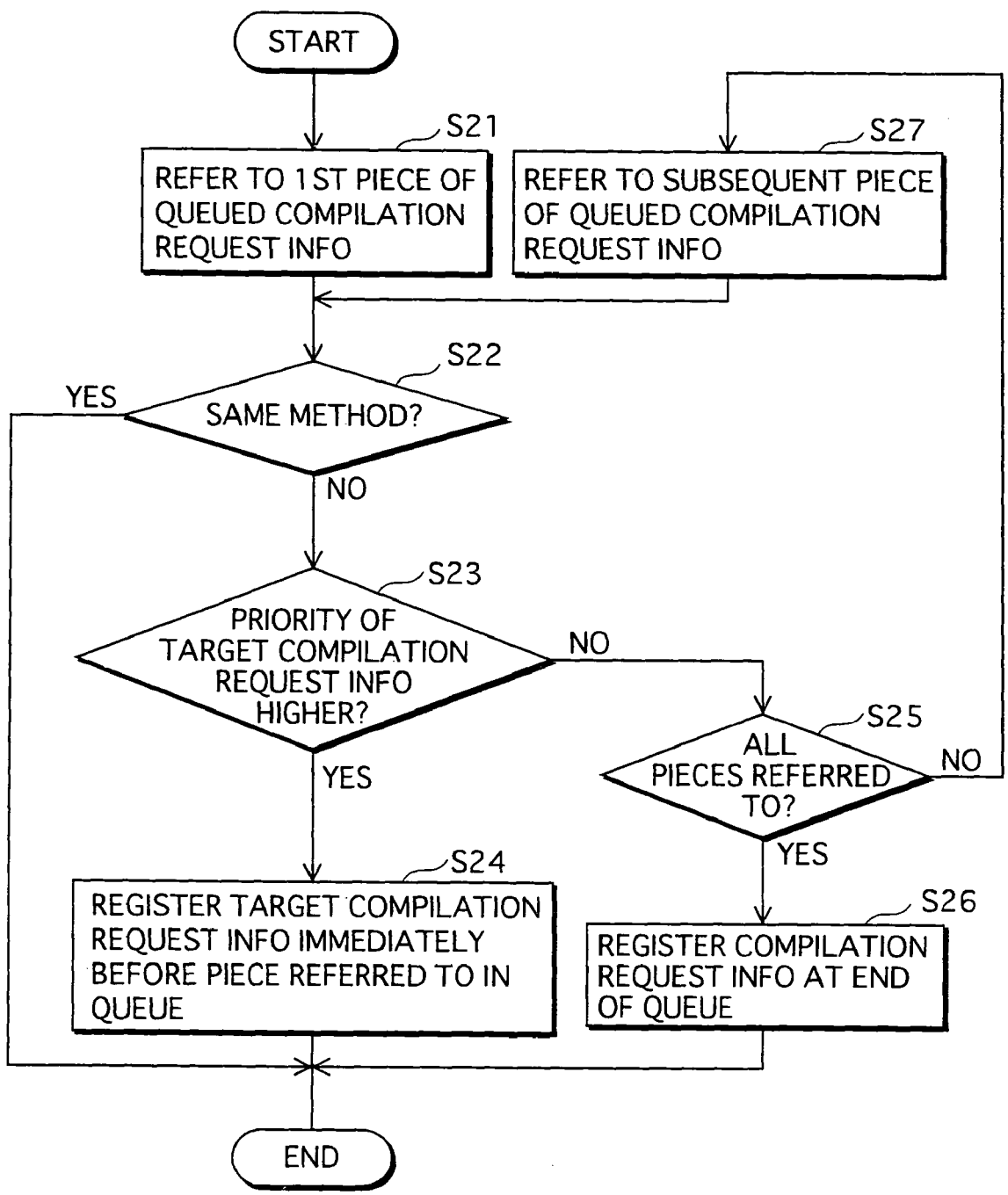
FIG. 13 is a flowchart of compilation request information placement processing.

FIG. 13 is a flowchart of the compilation request information placement processing by the queue control subunit 15B.

First, upon receipt of a compilation request by the registration request receiving subunit 14B, the queue control subunit 15B refers to the first piece of queued compilation request information (step S21).

Next, the queue control subunit 15B compares the method indicated by the received compilation request, with the method indicated by the compilation request information currently referred to. If the two methods match (step S22: YES), the compilation request information placement processing is terminated. If the two methods do not match (step S22: NO), a step S23 is performed.

In the step S23, the queue control subunit 15B compares the priority level of the method for which compilation request information is to be registered, with the priority level shown by the compilation request information currently referred to. As a result of the comparison, if the method currently under registration has a higher priority level (step S23: YES), a step S24 is performed. On the other hand, if the compilation request information currently referred to shows a higher priority level (step S23: NO), a step S25 is performed.

In the step S25, it is judged whether all the pieces of compilation request information have already been referred to. If all the pieces are referred to (step S25: YES), a step S26 is performed. If not (step S25: NO), a step S27 is performed.

In the step S27, in accordance with the pointer of the compilation request information currently referred to, the queue control subunit 15B now refers to an immediately subsequent piece of queued compilation request information, and goes back to the step S22.

In the step S26, the queue control subunit 15B registers, at the end of the queue, a new piece of compilation request information for the method indicated by the received compilation request. Then, the compilation request information placement processing is terminated.

In the step S24, the queue control subunit 15B registers a new piece of compilation request information at a position immediately preceding the compilation request information currently referred to. Then, the compilation request information placement processing is terminated.

Consider, for example, the case of registering compilation request information for the method "m3", into the queue of compilation request information shown in FIG. 12. The priority level of the method "m3" is "2". In this case, as a result of the compilation request information placement processing, compilation request information for the method "m3" is determined to be placed between pieces of compilation request information for the methods "m2" and "m1". More specifically, the queue control subunit 15B updates the pointers of the compilation request information for the methods "m2" and "m1", so that both the pointers show the storage location of the compilation request information for the method "m3". As a result, the compilation request information for the method "m3" is placed at the determined position in the queue.

Embodiment 4

A program execution control device according to an embodiment 4 registers compilation request information in one of three queues having a high priority, a medium priority, and a low priority, and compiles methods in order starting from methods indicated by compilation request information in the high priority queue. More specifically, compiled first is the method indicated by the first piece of compilation request information registered in the high-priority queue. After compiling all methods indicated by pieces of compilation request information in the high-priority queue, the method indicated by the first piece of compilation request information registered in the medium-priority queue is compiled. After compiling all methods indicated by pieces of compilation request information in the medium-priority queue, the method indicated by the first piece of compilation request information in the low-priority queue is compiled.

In the high-priority queue, specific pieces of compilation request information are registered in a batch at the time of OS startup. In the middle-priority queue, pieces of compilation request information for prioritized methods are registered according to the priority information table. The low-priority queue is for the remaining pieces of compilation request information registered neither in the high-priority queue nor in the middle-priority queue.

The following describes the program execution control device of the embodiment 4, with respect to its structure, data, and operation. Note that description overlapping that of the program execution control devices of the embodiments 1-3 are not repeated here.

Structure 4

Figure 14:
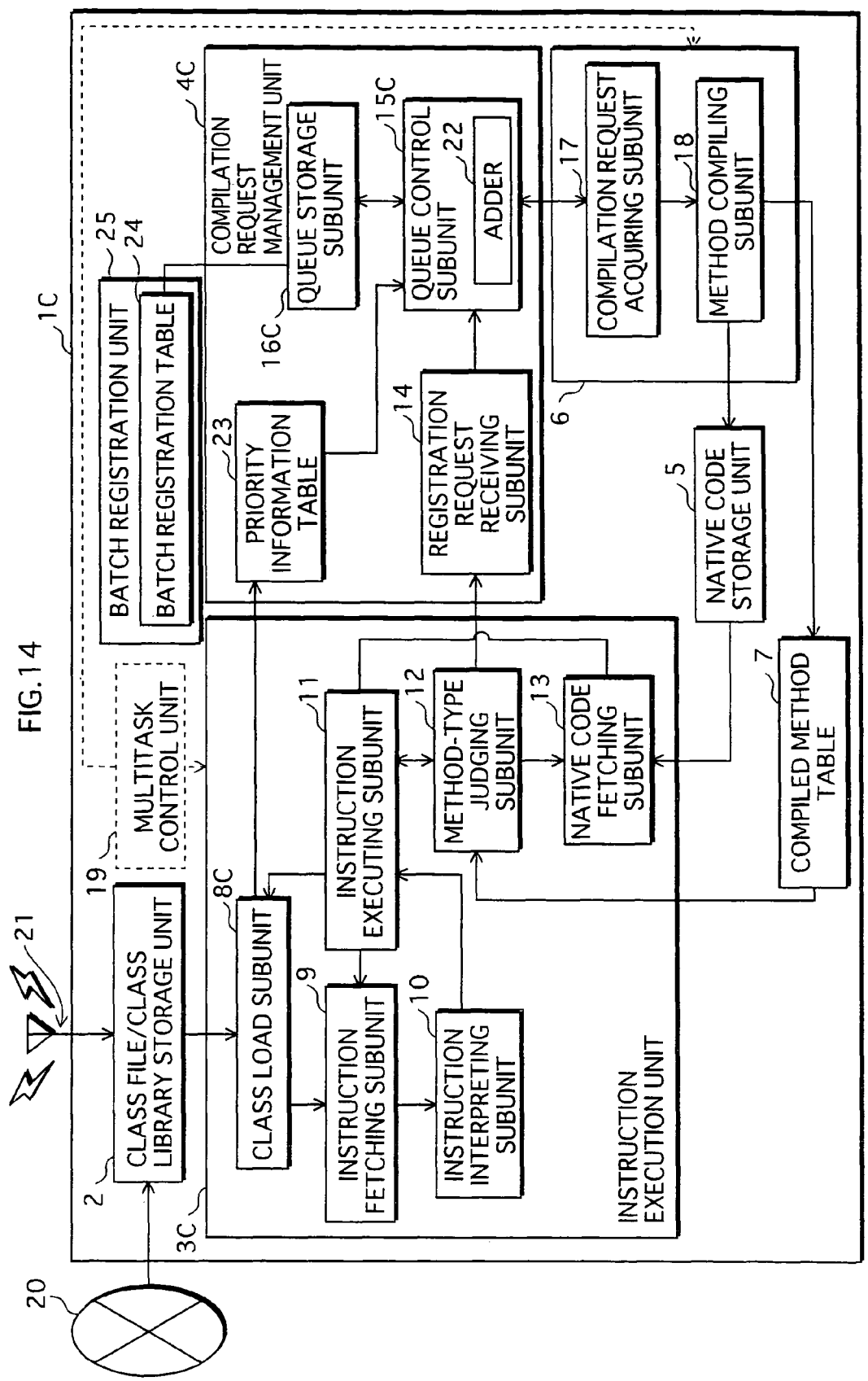
FIG. 14 is a functional diagram of a program execution control device 1C according to an embodiment 4.

FIG. 14 is a functional diagram of a program execution control device 1C according to the embodiment 4.

The program execution control device 1C differs from the program execution control device 1, with respect to the following three points. First, a queue control subunit 15C manages three queues having different priority levels. Second, a batch registration unit 25 and a batch registration information table 24 are additionally provided. The batch registration information table 24 stores method information showing the names and storage locations of methods to be compiled with priority. Upon OS startup, the batch registration unit 25 registers, in a queue storage subunit 16C, compilation request information of the methods listed in the batch registration information table 24. As mentioned above, each piece of compilation request information for those methods is placed in the high-priority queue. Finally, the sort processing and the compilation request information placement processing described in the embodiments 2 and 3 are employed.

Data 4

Next, a description is given to various data.

Figure 15:
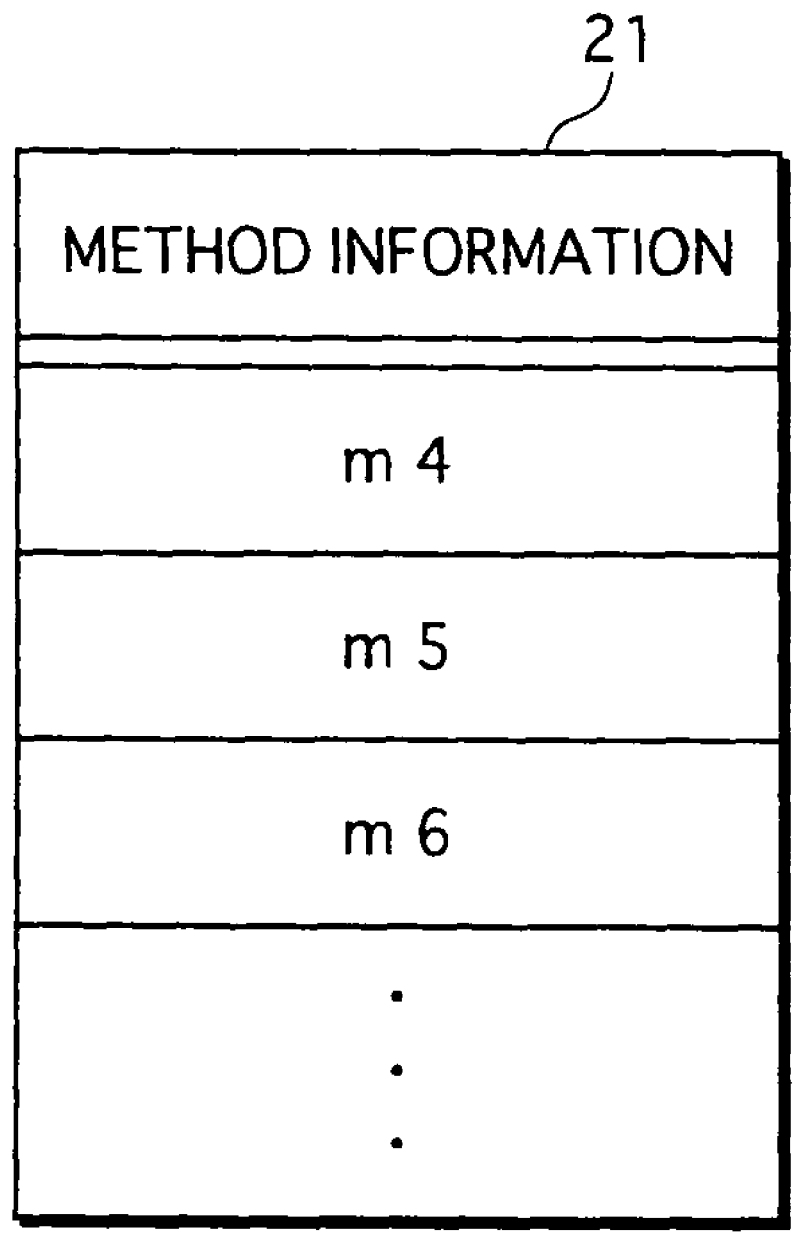
FIG. 15 is a view of a specific example of a batch registration information table 24.

FIG. 15 is a view of a specific example of the batch registration information table 24. Methods listed in the batch registration information table 24 include methods specified by a user to be compiled, and methods expected to be frequently invoked based on a result of program execution simulation.

Figure 16:
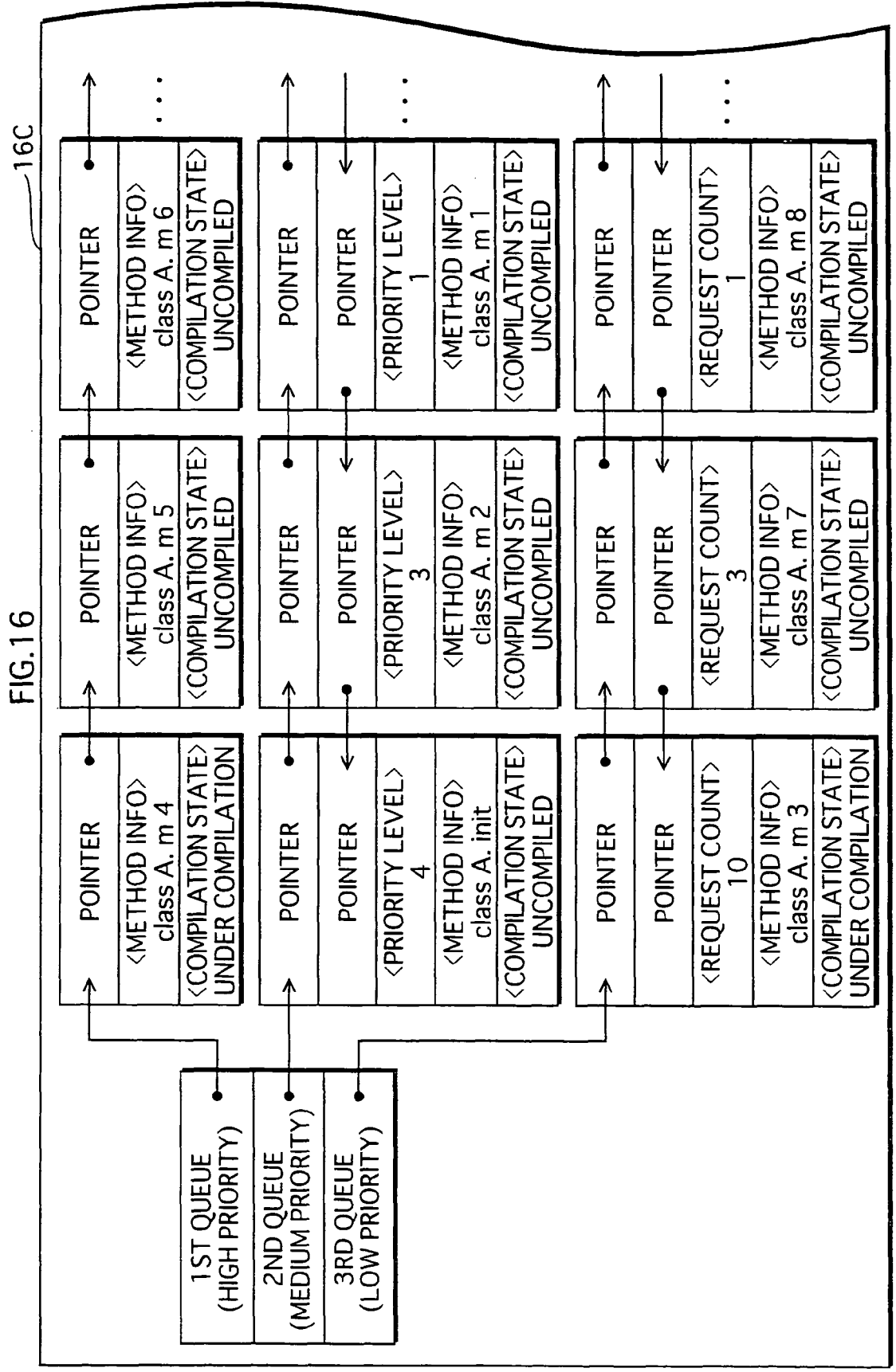
FIG. 16 is a view of a specific example of compilation request information registered in a queue storage subunit 16C according to the embodiment 4.

FIG. 16 is a view of a specific example of compilation request information registered in the queue storage subunit 16C. As shown in the figure, the queue storage subunit 16C stores the compilation request information in three queues: a first queue having a high priority, a second queue having a medium priority, and a third queue having a low priority. The first queue stores compilation request information for the methods "m4", "m5", and "m6", which are listed in the batch registration information table 24 shown in FIG. 15.

The second queue stores compilation request information for methods to which priority is assigned, and the compilation request information is placed in order of priority. The third queue stores compilation request information of methods other than the ones placed in the first and second queues, and the order of queued compilation request information is dynamically changed through the sort processing.

Embodiment 5

A program execution control device according to an embodiment 5 acquires a related method table from a class file. With reference to the related method table, the compilation unit 6 detects any method related to a method targeted for compilation. If any related method is detected, a registration request for the detected method is issued.

The following describes the program execution control device of the embodiment 5, with respect to its structure, data, and operation. Note that description overlapping that of the program execution control device 1 of the embodiment 1 is not repeated here.

Structure 5

Figure 17:
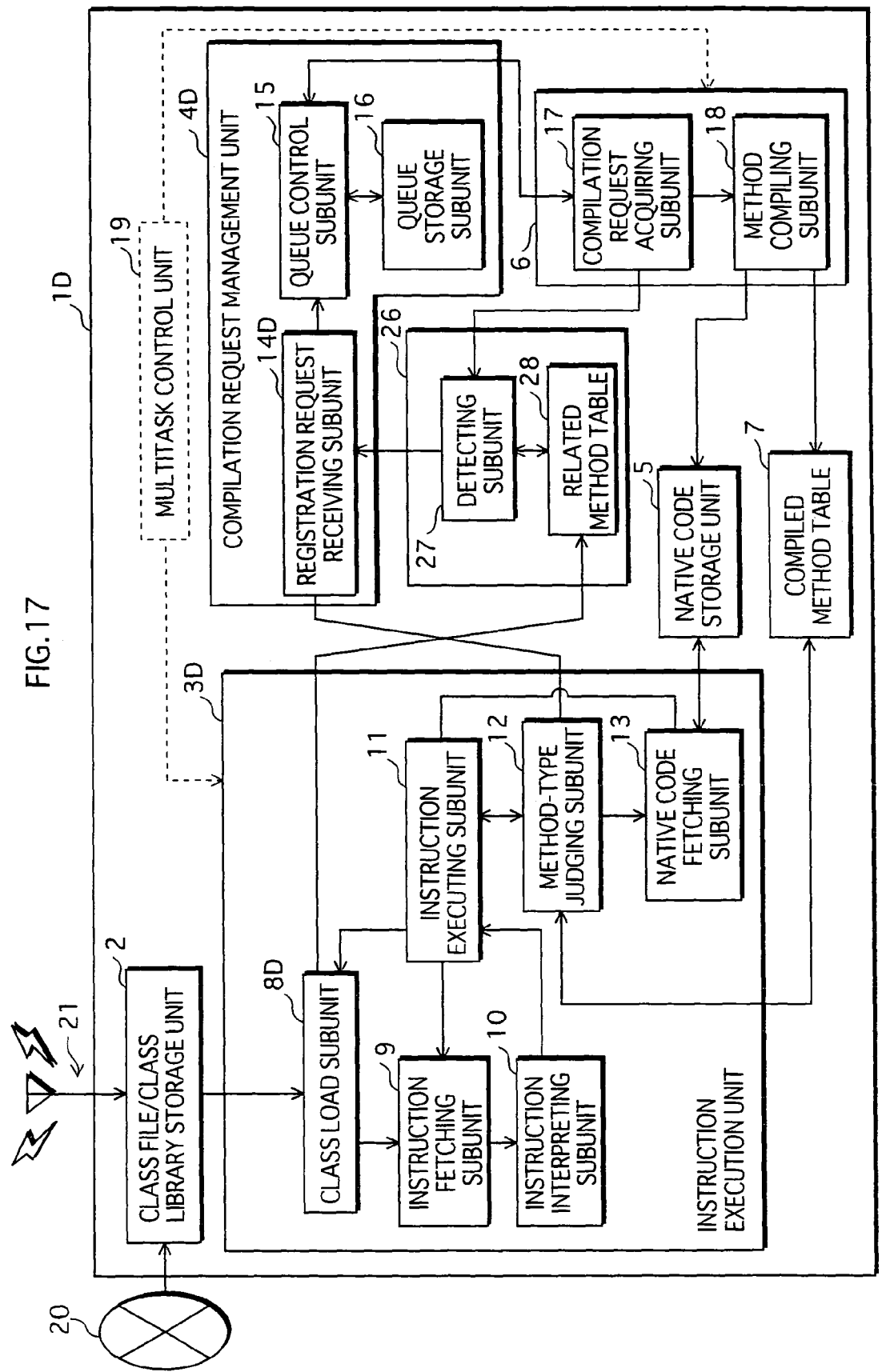
FIG. 17 is a functional diagram of a program execution control device 1D according to an embodiment 5.

FIG. 17 is a functional diagram of a program execution control device 1D according to the embodiment 5.

The program execution control device 1D differs from the program execution control device 1 in that a related method detection unit 26 is additionally provided.

The related method detection unit 26 includes a detecting subunit 27. The detecting subunit 27 acquires a related method table 28, and detects from the acquired related method table 28 any method related to the method informed by the compilation request acquiring subunit 17. If any related method is detected, the related method detecting unit 26 assumes that a compilation request for the method is issued and thus issues a compilation request for each detected method to the registration request receiving subunit 14D.

Data 5

FIG. 18 is a view showing a specific example of the related method table 28.

As shown in the figure, the method "init" is related to the methods "m1" and "m2", whereas the method "m3" is related to the methods "m4" and "m5".

Operation 5

Next, a description is given to the operation for related method detection processing. The related method detection processing starts with detection of a related method and ends with registration of a compilation request for the related method detected.

Figure 19:
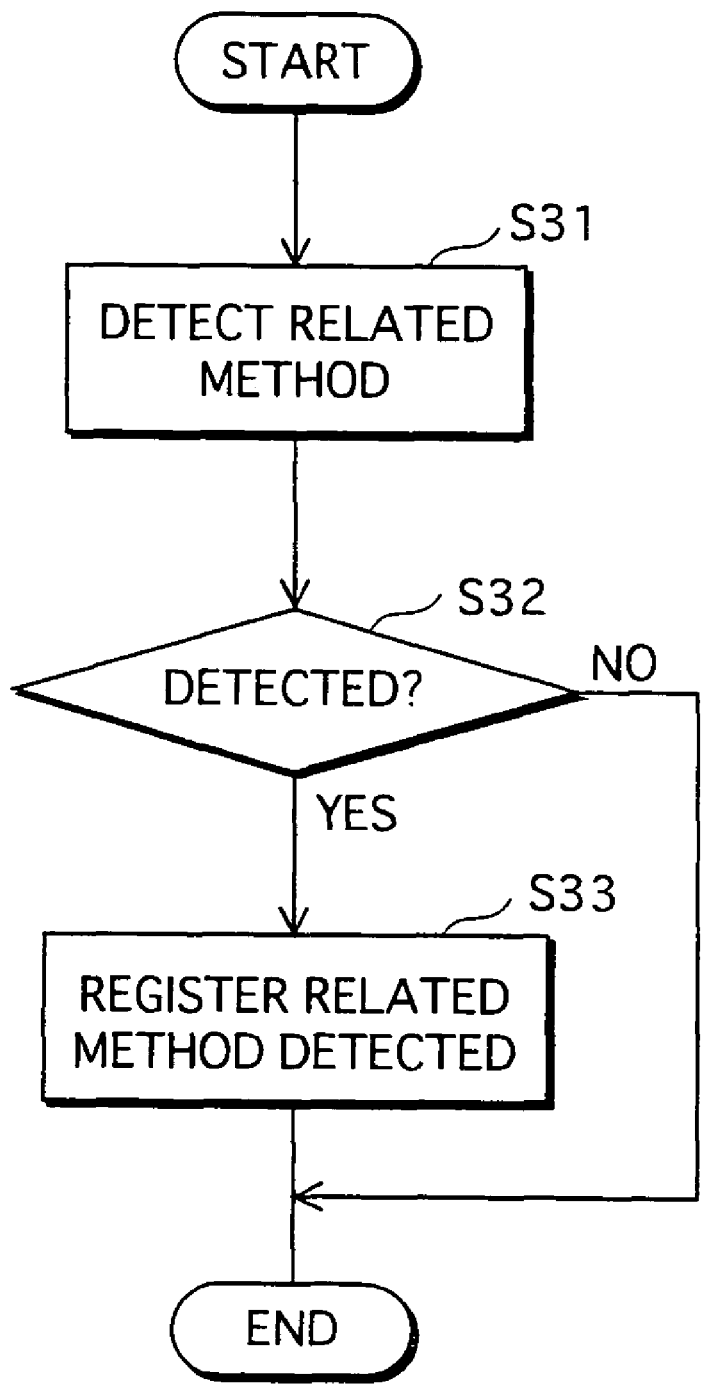
FIG. 19 is a flowchart of related method detection processing.

FIG. 19 is a flowchart of the related method detection processing performed by the related method detecting unit 26.

First, in response to a notification from the compilation request acquiring subunit 17 about a method requested to be compiled, the detecting subunit 27 detects any related method with reference to the related method table 28 (step S31).

If any related method is detected (step S32: YES), a step S33 is performed. If no related method is detected (step S32: NO), the related method detection processing is terminated.

In the step S33, the related method detecting unit 26 assumes that a compilation request for the detected related method is made, and issues to the registration request receiving subunit 14D, a compilation request for the detected related method. The processing is then terminated.

Here, the processing is more specifically described with reference to FIG. 18. On receiving a notification about the method "init" from the compilation request acquiring subunit 17, the related method detecting unit 26 detects a method related to the method "init", with reference to the related method table 28. As shown in FIG. 18, the method "init" is related to the methods "m1" and "m2", so that the related method detecting unit 26 issues compilation requests for the methods "m1" and "m2" to the registration request receiving subunit 14D.

Embodiment 6

A program execution control device according to an embodiment 6 performs compilation request information placement processing, based on the priority level of a respective method, as described in the embodiment 3. In addition, the program execution control device compares the priority level of a method to be compiled with the priority level of the instruction execution task. If the comparison shows that the priority level of the method is higher, priority inheritance processing is performed so as to make the priority level of the compilation task equal to that of the method.

The following describes the program execution control device of the embodiment 6, with respect to its structure, data, and operation. Note that description overlapping that of the program execution control device 1B of the embodiment 3 is not repeated here.

Structure 6

Figure 20:
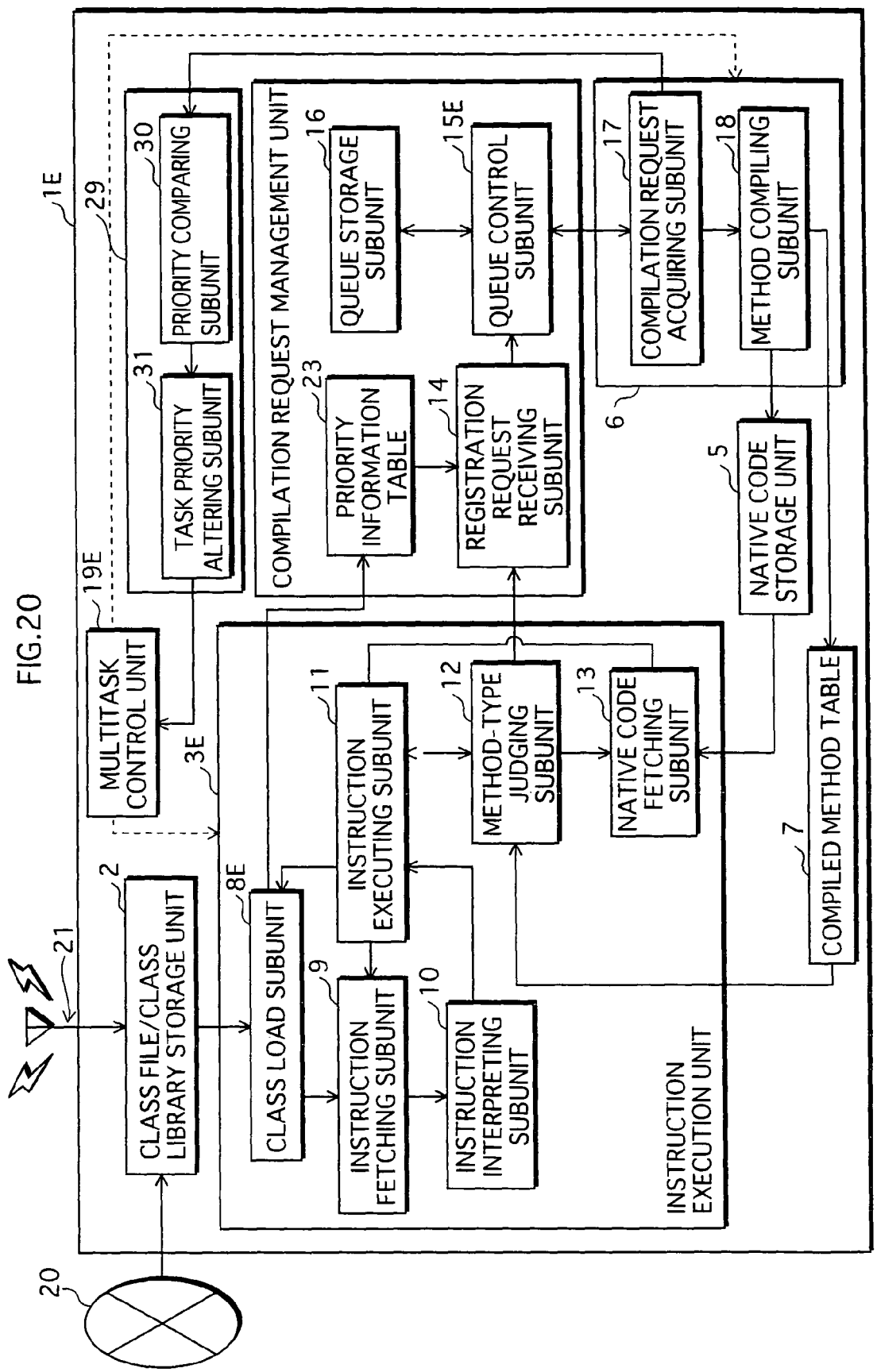
FIG. 20 is a functional diagram of a program execution control device 1E according to an embodiment 6.

FIG. 20 is a functional diagram of a program execution control device 1E according to the embodiment 6.

The program execution control device 1E differs from the program execution control device 1B of the embodiment 3 in that a priority inheritance unit 29 is additionally provided.

The priority inheritance unit 29 includes functional blocks of a priority comparing subunit 30 and a task priority altering subunit 31.

Upon receipt of a notification about the priority level of the method of which compilation is to be initiated, the priority comparing subunit 30 compares the priority levels of the method and of the instruction execution task.

If the comparison result shows that the priority level of the method targeted for compilation is higher, the task priority altering subunit 31 instructs the multitask control unit 19E to raise the priority level of the compilation task to make it equal to the priority level of the method.

The multitask control unit 19E alters the priority level of the compilation task according to the instruction from the task priority altering subunit 31.

Operation 6

Next, a description is given to the priority inheritance processing.

Figure 21:
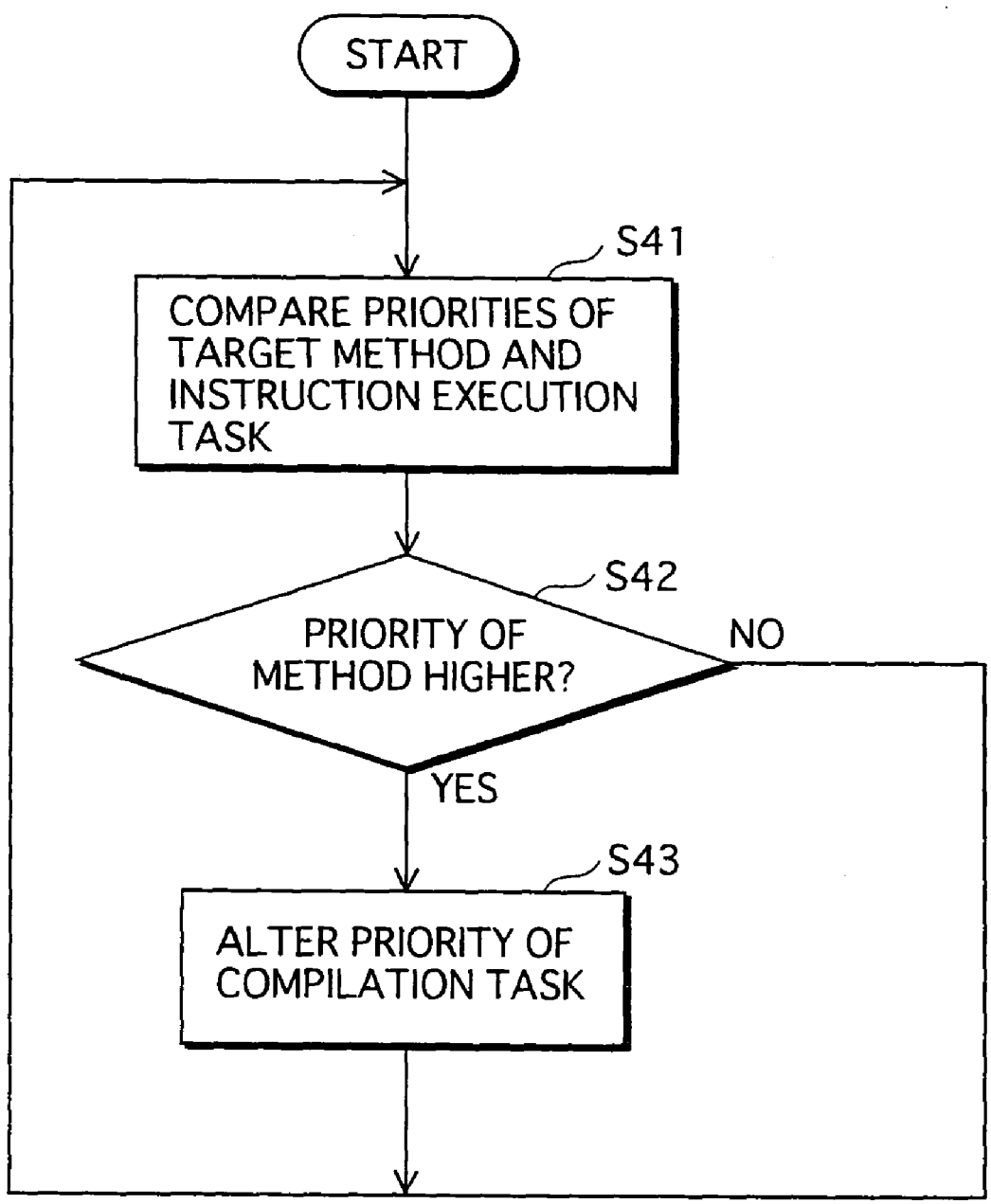
FIG. 21 is a flowchart of priority inheritance processing.

FIG. 21 is a flowchart of the priority inheritance processing.

First, on receiving a notification from the compilation request acquiring subunit 17 about the priority level of method of which compilation is to be initiated, the priority inheritance unit 29 compares the priority levels of the method and of the instruction execution processing (step S41).

If the comparison shows that the priority level of the method is higher (step S42: YES), the task priority altering subunit 31 instructs the multitask control unit 19E to alter the priority level of the compilation task to make it equal to the priority level of the method (step S43). On the other hand, if the priority level of the execution task is higher (step S42: NO), the processing returns to the step S41.

Suppose, for example, the priority levels of the instruction execution task and of the compilation task default to "6" and "2", respectively. The priority level of method targeted for compilation is "7". In this case, the comparison by the priority comparing subunit 30 shows that the priority levels of the method and of the instruction execution task are 7>6. That is, the priority level of the method is higher, so that the task priority altering subunit 31 instructs the multitask control unit 19E to alter the priority level of the compilation task to make it equal to the priority level of the method. In accordance with the instruction, the multitask control unit 19E raises the priority level of the compilation task to "7", which is higher than the default priority level "6" of the instruction execution task. Consequently, the processor resources are allocated to the compilation task on a priority basis.

SUPPLEMENTAL REMARKS

It is naturally appreciated that the present invention is not limited to the specific embodiments described above. Various modifications including the following may be made.

(1) According to the embodiment 1, when the method-type judging subunit 12 judges that compilation of the method to be invoked is not done, the method is immediately interpreted and executed. Yet, in the case where the invoked method is under compilation, it is applicable to wait for the method to be compiled and execute the resulting native code. Operation for such processing is described below with reference to FIG. 22.

Figure 22:
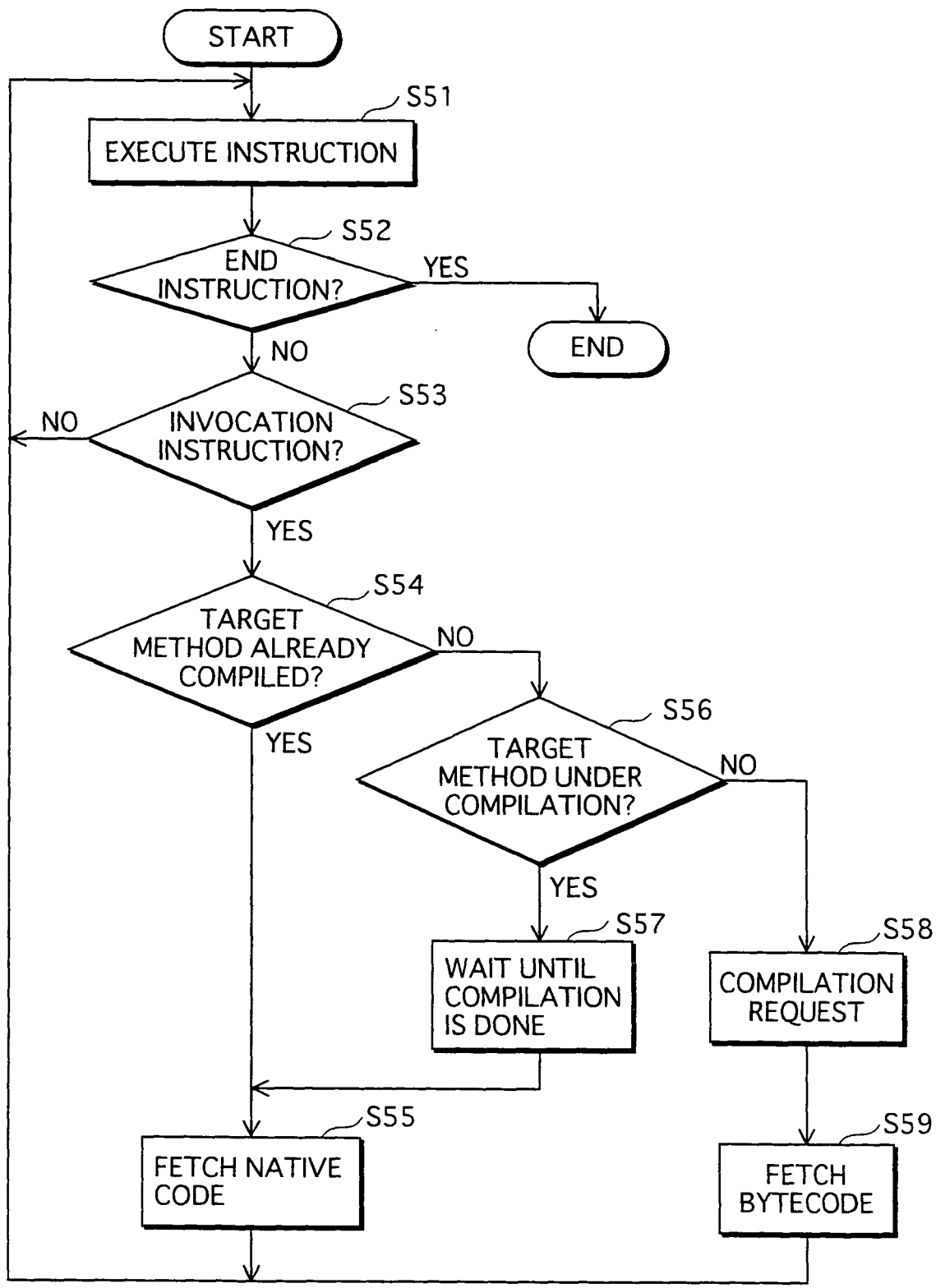
FIG. 22 is a flowchart of a modified instruction execution task.

FIG. 22 is a flowchart of an instruction execution task in which execution of a method under compilation is postponed until the compilation is done.

First, the instruction executing subunit 11 instructs the processor to execute a fetched instruction (step S51). If the instruction targeted for execution is a program end instruction (step S52: YES), the processing is terminated. If not (step S52: NO), a step S53 is performed.

In the step S53, if the target instruction is an invocation instruction (step S53: YES), a step S54 is performed. If not (step S53: NO), the processing returns to the step S51.

In the step S54, the method-type judging subunit 12 judges, with reference to the compiled method table 7, whether the method targeted for invocation has previously been compiled. If the target method has been compiled (step S54: YES), a step S55 is performed. If not (step S54: NO), a step S56 is performed.

In the step S55, the native code fetching subunit 13 fetches native code associated with the target method from the native code storage unit 5, and sends the fetched native code to the instruction executing subunit 11. The processing then returns to the step S51.

In the step S56, the method-type judging subunit 12 instructs the queue control subunit 15 to check the queue to see if the target method is currently under compilation. If the target method is currently under compilation (step S56: YES), the method-type judging subunit 12 waits until the compilation is done (step S57). If not (step S56: NO), the method-type judging subunit 12 issues a compilation request to the compilation request management unit 4 (step S58). In a step S59 that follows, the instruction fetching subunit 9 fetches bytecodes associated with the method and the instruction interpreting subunit 10 interprets the fetched bytecodes. The processing then returns to the step S51.

(2) FIG. 1 shows the execution transition between one execution task and one compilation task. Yet, there may be a plurality of instruction execution tasks and compilation tasks. In such a case, different priority levels may be assigned to the tasks.

In the above embodiments, the instruction execution task is assigned a higher priority than the compilation task. When there is a plurality of compilation tasks, it is applicable to assign, as an exception, a higher priority to a specific compilation task than the instruction execution tasks.

In the embodiment 4, for example, there are three queues with high, medium, and low priority levels. Here, it is applicable to assign a higher priority level to the compilation task of compiling methods indicated by compilation request information registered in the first queue, than the priority level of the instruction execution task.

(3) The program execution control devices according to the above embodiments are described as executing the tasks by pseudo-parallel processing. Yet, the program execution control device according to the present invention may concurrently execute the tasks with a multi processor or a plurality of separate processors.

(4) Application of the present invention is not limited to a program execution control device implementing a JVM with a JIT compiler. The present invention is also applicable to any program execution control device implementing a virtual machine having a compiling function for intermediate code.

(5) In the above embodiments, the order of methods for compilation is managed with queues. Yet, it is not essential part of the program execution control device of the present invention to manage compilation order in queues. For example, the order of compilation may be determined by obtaining a threshold specific to each program or class file, and methods are compiled in the order in which the respective request counts exceed the threshold. Alternatively, it is applicable to compile, at predetermined time intervals during program execution, a highest priority method at the time among methods for which compilation request information is registered. Alternatively, it is applicable to compile, each time the processor resources are allocated to the compilation task, a highest priority method at the time among methods for which compilation request information is registered.

(6) In the embodiment 4, three queues having different priority levels are employed. Yet, the number of queues is not limited to three, and two or four queues may be employed, for example.

(7) The program execution control device according to the present invention has a garbage collection function that a JVM generally provides. The garbage collection function is carried out as a garbage collection task, in parallel with the instruction execution task and the compilation task. It is applicable to perform garbage collection to discard generated native code that will never or rarely be used.

(8) It is applicable to provide a control program for causing a device with a program execution function to perform the processing steps (shown in FIGS. 6, 9, 13, 19, 21, and 22) performed by the program execution control devices according to the embodiments described above. Such a control program may be distributed in form of a recording medium or via various communications lines. Examples of such a recording medium include an IC card, an optical disc, a flexible disk, and a ROM. Distributed control programs may be put to use by being installed into a device having a ROM. By executing the control program, the device carries out the function equivalent to that performed by the program execution control devices of the above embodiments.

INDUSTRIAL APPLICABILITY

A program execution control device according to the present invention is applicable as a virtual machine implemented on various electronic appliances having processors.

The invention claimed is:

1. A program execution control device comprising a processor and a storage unit,
    wherein said program execution control device causes said processor to execute a program stored in said storage unit,
    wherein the program is composed of one or more sets of bytecodes including a bytecode for invoking a bytecode set,
    wherein said program execution control device further comprises:
        a judging unit operable, for each execution of an invocation bytecode during execution of the program, to judge whether a bytecode set targeted for invocation is already compiled to native code specific to said processor;
        a first unit operable, when the target bytecode set is judged to be uncompiled, to instruct said processor so that the target bytecode set is sequentially interpreted and executed, and to issue a request to compile the target bytecode set to native code;
        a second unit operable, when the target bytecode set is judged to be compiled, to instruct said processor to execute native code resulting from the compilation; and
        a third unit operable to instruct said processor to compile a bytecode set indicated by a compilation request issued by said first unit, in parallel with the bytecode interpretation and execution by said first unit and (ii) the native code execution by said second unit,
    wherein said program execution control device operates under control of a multitask operating system,
    wherein the compilation by said third unit is executed as a separate task from the bytecode execution by said first unit and the native code execution by said second unit,
    wherein the tasks of said first and second units are assigned a higher priority level than a priority level assigned to the task of said third unit, and
    wherein said program execution control device further comprises:
        a priority information acquiring unit operable to acquire information showing a priority level of each bytecode set;
        a comparing unit operable to compare priority levels of (i) the bytecode set indicated by the compilation request and (ii) the instruction execution task; and
        a priority altering unit operable to temporarily raise a priority level of the compilation task, when the comparison shows that the priority level of the bytecode set indicated by the compilation request is higher than the priority level of the instruction execution task.

2. The program execution control device according to claim 1, further comprising:
    a switching unit operable to switch to task execution by said third unit when task execution by said first or second unit is placed in a standby state.

3. The program execution control device according to claim 2, further comprising:
    a request management unit operable to register compilation request information in said storage unit in response to a compilation request issued by said first unit, and to manage the registered compilation request information, each piece of compilation request information being used for compiling a bytecode set indicated by a corresponding compilation request,
    wherein said third unit instructs said processor to compile each bytecode set indicated by compilation request information registered in said storage unit, in parallel with (i) the bytecode interpretation and execution by said first unit and (ii) the native code execution by said second unit.

4. The program execution control device according to claim 3,
wherein said request management unit does not register compilation request information in duplicate if compilation request information for a bytecode set indicated by a compilation request is already registered in said storage unit.

5. The program execution control device according to claim 3,
wherein said request management unit includes:
a specifying subunit operable, in response to a compilation request issued by said first unit, to specify, with reference to the acquired priority information, a priority level of a bytecode set indicated by the compilation request;
a comparing subunit operable to compare the specified priority level with a priority level of each bytecode set indicated by the registered pieces of compilation request information in said storage unit; and
a determining subunit operable to determine a position for placing a new piece of compilation request information for the bytecode set indicated by the compilation request so that the registered pieces of compilation request information are queued in descending order of priority.

6. The program execution control device according to claim 3, further comprising:
a relational information acquiring unit operable to acquire relational information showing each bytecode set together with one or more bytecode sets related to the bytecode set; and
a detecting unit operable to detect, with reference to the relational information, one or more bytecode sets related to the bytecode set indicated by the compilation request,
wherein said request management unit registers compilation request information for the one or more related bytecode sets detected by said detecting unit.

7. The program execution control device according to claim 3,
wherein, with reference to the acquired priority information, said third unit instructs said processor to compile bytecode sets indicated by the pieces of compilation request information registered in said storage unit in descending order of priority.

8. The program execution control device according to claim 3, further comprising:
a count recording unit operable to keep a count of compilation requests made to a respective bytecode set when compilation of the bytecode set is repeatedly requested, and records the request count to said storage unit as part of the corresponding compilation request information for the bytecode set; and
an acquiring unit operable to acquire a threshold of request count,
wherein said third unit instructs said processor to compile bytecode sets in an order in which the respective request counts of the bytecode sets exceed the threshold.

9. The program execution control device according to claim 2,
wherein said request management unit places pieces of compilation request information in a queue in an order in which compilation requests, corresponding to the pieces of compilation request information, are received, and
wherein said third unit instructs said processor to compile bytecode sets in order starting from a bytecode set indicated by a first piece of queued compilation request information.

10. The program execution control device according to claim 9, further comprising:
a count recording unit operable to keep a count of compilation requests made to a respective bytecode set when compilation of the bytecode set is repeatedly requested, and records the request count to said storage unit as part of the corresponding compilation request information for the bytecode set; and
an order altering unit operable to compare the respective request counts and alter positions of the pieces of queued compilation request information in descending order of the respective request counts.

11. The program execution control device according to claim 9,
wherein said request management unit manages a plurality of queues with different priority levels, and
wherein said third unit instructs said processor to compile bytecode sets in an order starting from bytecode sets indicated by compilation request information placed in a highest priority queue.

12. The program execution control device according to claim 11, further comprising:
a special request information acquiring unit operable to acquire, prior to execution of the program, information showing a plurality of bytecode sets requested to be compiled,
wherein said request management unit registers, in a batch, compilation request information for all bytecode sets shown by the special request information in a highest priority queue.

13. The program execution control device according to claim 1, further comprising:
a second judging unit operable, when said judging unit judges that the target bytecode set is uncompiled, to judge whether the target bytecode set is currently under compilation; and
a fourth unit operable, when the target bytecode set is judged to be currently under compilation, to wait until the compilation is done, and to subsequently instruct said processor to execute native code resulting from the compilation.

14. The program execution control device according to claim 1, further comprising:
a request management unit operable to register compilation request information in a storage unit in response to a compilation request issued by said first unit, and to manage the registered compilation request information, each piece of compilation request information being used for compiling a bytecode set indicated by a corresponding compilation request,
wherein said third unit instructs said processor to compile each bytecode set indicated by compilation request information registered in said storage unit, in parallel with (ii) the bytecode interpretation and execution by said first unit and (ii) the native code execution by said second unit.

15. A program execution control method for causing a processor to execute a program composed of one or more sets of bytecodes including a bytecode for invoking a bytecode set, comprising:
a judging step, for each execution of an invocation bytecode during execution of the program, of judging whether a bytecode set targeted for invocation is already compiled to native code specific to the processor;

a first step, when the target bytecode set is judged to be uncompiled, of instructing the processor so that the target bytecode set is sequentially interpreted and executed, and of issuing a request to compile the target bytecode set to native code;

a second step, when the target bytecode set is judged to be compiled, of instructing the processor to execute native code resulting from the compilation; and a third step of instructing the processor to compile a bytecode set indicated by a compilation request issued in said first step, in parallel with the bytecode interpretation and execution in said first step as well as with the native code execution in said second step, wherein the processor operates under control of a multitask operating system, wherein the compilation by said third step is executed as a separate task from the bytecode execution by said first step and the native code execution by said second step, wherein the tasks of said first and second steps are assigned a higher priority level than a priority level assigned to the task of said third step, and wherein said program execution control method further comprises:

a priority information acquiring step of acquiring information showing a priority level of each bytecode set;

a comparing step of comparing priority levels of (i) the bytecode set indicated by the compilation request and (ii) the instruction execution task; and a priority altering step of temporarily raising a priority level of the compilation task, when the comparison shows that the priority level of the bytecode set indicated by the compilation request is higher than the priority level of the instruction execution task.

16. A non-transitory computer readable recording medium having stored thereon a control program for causing a processor to execute another program composed of one or more sets of bytecodes including a bytecode for invoking a bytecode set, wherein, when executed, the control program causes the processor to perform a method comprising:

a judging step, for each execution of an invocation bytecode during execution of the program, of judging whether a bytecode set targeted for invocation is already compiled to native code specific to the processor;

a first step, when the target bytecode set is judged to be uncompiled, of instructing the processor so that the target bytecode set is sequentially interpreted and executed, and of issuing a request to compile the target bytecode set to native code;

a second step, when the target bytecode set is judged to be compiled, of instructing the processor to execute native code resulting from the compilation; and a third step of instructing the processor to compile a bytecode set indicated by a compilation request issued in said first step, in parallel with the bytecode interpretation and execution in said first step as well as with the native code execution in said second step, wherein the processor operates under control of a multitask operating system, wherein the compilation by said third step is executed as a separate task from the bytecode execution by said first step and the native code execution by said second step, wherein the tasks of said first and second steps are assigned a higher priority level than a priority level assigned to the task of said third step, and wherein said program execution control method further comprises:

a priority information acquiring step of acquiring information showing a priority level of each bytecode set;

a comparing step of comparing priority levels of (i) the bytecode set indicated by the compilation request and (ii) the instruction execution task; and a priority altering step of temporarily raising a priority level of the compilation task, when the comparison shows that the priority level of the bytecode set indicated by the compilation request is higher than the priority level of the instruction execution task.

* * * * *